(12) United States Patent
Awoniyi et al.

(10) Patent No.: US 8,891,467 B2
(45) Date of Patent: Nov. 18, 2014

(54) DYNAMIC BANDWIDTH ADJUSTMENT IN FLEXIBLE BANDWIDTH SYSTEMS

(75) Inventors: Olufunmilola O. Awoniyi, San Diego, CA (US); Soumya Das, San Diego, CA (US); Edwin C. Park, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 13/466,348

(22) Filed: May 8, 2012

(65) Prior Publication Data

US 2013/0121265 A1 May 16, 2013

Related U.S. Application Data

(60) Provisional application No. 61/556,777, filed on Nov. 7, 2011, provisional application No. 61/568,742, filed on Dec. 9, 2011.

(51) Int. Cl.

| | |
|---|---|
| H04W 4/00 | (2009.01) |
| H04W 72/04 | (2009.01) |
| H04W 24/10 | (2009.01) |
| H04W 72/08 | (2009.01) |
| H04W 52/44 | (2009.01) |
| H04W 72/12 | (2009.01) |
| H04W 16/14 | (2009.01) |
| H04W 52/14 | (2009.01) |
| H04W 52/24 | (2009.01) |
| H04W 52/40 | (2009.01) |
| H04W 88/06 | (2009.01) |
| H04W 88/10 | (2009.01) |

(52) U.S. Cl.
CPC .......... *H04W 72/0453* (2013.01); *H04W 24/10* (2013.01); *H04W 72/082* (2013.01); *H04W 52/44* (2013.01); *H04W 72/04* (2013.01); *H04W 72/1273* (2013.01); *H04W 72/1268* (2013.01); *H04W 16/14* (2013.01); *H04W 72/1215* (2013.01); *H04W 52/146* (2013.01); *H04W 52/247* (2013.01); *H04W 52/40* (2013.01); *Y02B 60/50* (2013.01); *H04W 88/06* (2013.01); *H04W 88/10* (2013.01); *H04W 72/1289* (2013.01)
USPC ....................................................... 370/329

(58) Field of Classification Search
CPC ...... H04W 72/04; H04W 88/08; H04W 76/00
USPC ................................................. 370/464–465
See application file for complete search history.

(56) References Cited

U.S. PATENT DOCUMENTS

| 7,206,350 B2 | 4/2007 | Korobkov et al. |
| 7,778,307 B2 | 8/2010 | Kuchibhotla et al. |

(Continued)

OTHER PUBLICATIONS

Co-pending U.S. Appl. No. 13/707,111, filed Dec. 6, 2012.

(Continued)

*Primary Examiner* — Warner Wong
(74) *Attorney, Agent, or Firm* — Jeffrey D. Jacobs

(57) ABSTRACT

Methods, systems, and devices are provided for dynamically adapting the bandwidth of flexible bandwidth carriers. Adapting the bandwidth of a flexible bandwidth carrier may be achieved through changing the scale factor of the flexible bandwidth signal. Information such as traffic patterns, interference measurements, etc., may be utilized to determine the adapted scaling factors. In macrocellular deployments, for example, dynamically adjusting the bandwidth of a flexible bandwidth system may be utilized in order to increase network capacity, mitigate interference caused to other carriers, avoid adjacent carrier interference, and/or save energy on the network. Traffic pattern and other information may also be utilized to dynamically adjust uplink and downlink bandwidths of a flexible bandwidth carrier, either jointly or independently.

52 Claims, 18 Drawing Sheets

(56) References Cited

U.S. PATENT DOCUMENTS

| | | | |
|---|---|---|---|
| 8,041,363 B2* | 10/2011 | Burchfiel | 455/452.1 |
| 8,311,554 B2* | 11/2012 | Abedi | 455/454 |
| 8,660,169 B1* | 2/2014 | Karabinis | 375/219 |
| 2002/0036997 A1* | 3/2002 | Kim et al. | 370/335 |
| 2002/0061031 A1* | 5/2002 | Sugar et al. | 370/466 |
| 2004/0224719 A1* | 11/2004 | Nounin et al. | 455/553.1 |
| 2005/0094558 A1 | 5/2005 | Lu | |
| 2007/0242600 A1* | 10/2007 | Li et al. | 370/210 |
| 2008/0144612 A1 | 6/2008 | Honkasalo et al. | 370/370 |
| 2009/0196180 A1* | 8/2009 | Bahl et al. | 370/235 |
| 2009/0316649 A1 | 12/2009 | Chen | |
| 2010/0234040 A1 | 9/2010 | Palanki et al. | |
| 2010/0246455 A1 | 9/2010 | Nangia et al. | |
| 2010/0271965 A1 | 10/2010 | Siomina et al. | |
| 2011/0103330 A1 | 5/2011 | Montojo et al. | |
| 2011/0124333 A1 | 5/2011 | Lotze et al. | |
| 2011/0222484 A1 | 9/2011 | Pedersen et al. | |
| 2011/0237288 A1 | 9/2011 | Ratasuk et al. | |
| 2011/0244847 A1 | 10/2011 | Mallik et al. | |
| 2011/0306350 A1 | 12/2011 | Barbieri et al. | |
| 2012/0026972 A1 | 2/2012 | Miao et al. | |
| 2013/0114415 A1 | 5/2013 | Das et al. | |
| 2013/0114433 A1 | 5/2013 | Park et al. | |
| 2013/0114436 A1 | 5/2013 | Dural et al. | |
| 2013/0114473 A1 | 5/2013 | Awoniyi et al. | |
| 2013/0114566 A1 | 5/2013 | Awoniyi et al. | |
| 2013/0114571 A1 | 5/2013 | Das et al. | |
| 2013/0115967 A1 | 5/2013 | Soliman et al. | |
| 2013/0115991 A1 | 5/2013 | Awoniyi et al. | |
| 2013/0115994 A1 | 5/2013 | Awoniyi et al. | |
| 2013/0148520 A1 | 6/2013 | Das et al. | |
| 2013/0148527 A1 | 6/2013 | Awiniyi et al. | |
| 2013/0148576 A1 | 6/2013 | Huang et al. | |
| 2013/0148579 A1 | 6/2013 | Das et al. | |
| 2013/0148627 A1 | 6/2013 | Das et al. | |
| 2013/0148628 A1 | 6/2013 | Das et al. | |
| 2013/0148629 A1 | 6/2013 | Das et al. | |
| 2013/0150045 A1 | 6/2013 | Das et al. | |
| 2013/0176952 A1* | 7/2013 | Shin et al. | 370/329 |
| 2013/0182655 A1 | 7/2013 | Das et al. | |
| 2013/0195031 A1* | 8/2013 | Hessler et al. | 370/329 |
| 2013/0301622 A1* | 11/2013 | Bahl et al. | 370/336 |
| 2014/0018071 A1* | 1/2014 | Mennerich et al. | 455/434 |

OTHER PUBLICATIONS

Arslan, et al., "FERMI: A Femtocell Resource Management System for Interference Mitigation in OFDMA Networks," MobiCom '11 Proceedings of the 17th annual international conference on Mobile computing and networking, 2011, pp. 25-36.

International Search Report and Written Opinion—PCT/US2012/063905—ISA/EPO—Feb. 27, 2013.

NEC Group: "Framework to define additional carrier type: Carrier segments", R1-113227, 3rd Generation Partnership Project (3GPP), Mobile Competence Centre ; 650, Route Des Lucioles ; F-06921 Sophia-Antipolis Cedex ; France, vol. RAN WG1, No. Zhuhai; Oct. 4, 2011,XP050538345.

Zte: "Discussion on additional carrier types for LTE Rel-11", R1-113003, 3rd Generation Partnership Project (3GPP), Mobile Competence Centre; 650, Route Des Lucioles ; F-06921 Sophia-Antipolis Cedex ; France, vol. RAN WG1, No. Zhuhai; Oct. 4, 2011, XP050538191.

* cited by examiner

DYNAMIC BANDWIDTH ADJUSTMENT IN FLEXIBLE BANDWIDTH SYSTEMS

CROSS-RELATED APPLICATIONS

The present application for patent claims priority to Provisional Application No. 61/556,777 entitled "FRACTIONAL SYSTEMS IN WIRELESS COMMUNICATIONS" filed Nov. 7, 2011, and assigned to the assignee hereof and hereby expressly incorporated by reference herein. The present application for patent also claims priority to Provisional Application No. 61/568,742 entitled "SIGNAL CAPACITY BOOSTING, COORDINATED FORWARD LINK BLANKING AND POWER BOOSTING, AND REVERSE LINK THROUGHPUT INCREASING FOR FLEXIBLE BANDWIDTH SYSTEMS" filed Dec. 9, 2011, and assigned to the assignee hereof and hereby expressly incorporated by reference herein.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiple of channel bandwidths, hence there may be unutilized parts of the spectrum. As the use of wireless devices has increased, the demand for and value of this spectrum has generally surged, as well. Nonetheless, in some cases, wireless communications systems may not utilize portions of the allocated spectrum because the portions are not big enough to fit a standard or normal waveform. The developers of the LTE standard, for example, recognized the problem and decided to support 6 different system bandwidths, namely 1.4, 3, 5, 10, 15 and 20 MHz. This may provide one partial solution to the problem. Flexible bandwidth carriers may provide another solution, though some flexible bandwidth carriers may utilize bandwidth with fixed width utilizing a specific scaling factor, for example.

SUMMARY

Methods, systems, and devices are provided for dynamically adapting the bandwidth of flexible bandwidth carriers. Adapting the bandwidth of a flexible bandwidth carrier may be achieved through changing the scale factor of the flexible bandwidth signal. Information such as traffic patterns, interference measurements, etc., may be utilized to determine the adapted scaling factors. In macrocellular deployments, dynamically adjusting the bandwidth of a flexible bandwidth system may be utilized in order to increase network capacity, mitigate interference caused to other carriers, avoid adjacent carrier interference, and/or save energy on the network. Traffic pattern and other information may also be utilized to dynamically adjust the uplink and downlink bandwidths of a flexible bandwidth carrier, either jointly or independently.

Flexible bandwidth carriers for wireless communications systems may utilize portions of spectrum that may not be big enough to fit a normal waveform utilizing flexible waveforms. A flexible bandwidth system may be generated with respect to a normal bandwidth system through dilating, or scaling down, the time or the chip rate of the flexible bandwidth system with respect to the normal bandwidth system. Some embodiments may increase the bandwidth of a waveform through expanding, or scaling up, the time or the chip rate of the flexible bandwidth system.

Some embodiments include a method of dynamically adapting flexible bandwidth in a wireless communications system. The method may include: identifying a first scaling factor of a first flexible bandwidth carrier; determining a second scaling factor; and/or adapting a bandwidth of the first flexible bandwidth carrier from utilizing the first scaling factor to utilizing the second scaling factor.

Adapting the bandwidth of the first flexible bandwidth from utilizing the first scaling factor to utilizing the second scaling factor may include increasing the bandwidth of the first flexible bandwidth carrier. Adapting the bandwidth of the first flexible bandwidth from utilizing the first scaling factor to utilizing the second scaling factor may include decreasing the bandwidth of the first flexible bandwidth carrier.

Some embodiments further include handing over a mobile device camped on the first flexible bandwidth carrier to another bandwidth carrier before decreasing the bandwidth of the first flexible bandwidth carrier. Some embodiments further include adapting a bandwidth of a first downlink flexible bandwidth carrier from utilizing the first scaling factor to utilizing a third scaling factor different from the second scaling factor. The first flexible bandwidth carrier may include a first uplink flexible bandwidth carrier and the second scaling factor and third scaling factor may be determined based on one or more traffic patterns for at least the first uplink flexible bandwidth carrier or the first downlink flexible bandwidth carrier. Some embodiments further include adapting a bandwidth of a second downlink flexible bandwidth carrier from utilizing the first scaling factor to utilizing a fourth scaling factor; and/or adapting a bandwidth of a second uplink flexible bandwidth carrier from utilizing the first scaling factor to utilizing a fifth scaling factor. Some embodiments further include coupling at least the first uplink flexible bandwidth carrier with the second downlink carrier or the second uplink flexible bandwidth carrier with the first downlink carrier. Some embodiments further include assigning at least one user to at least the first uplink flexible bandwidth carrier, the second uplink flexible bandwidth carrier, the first downlink flexible bandwidth carrier, or the second downlink flexible bandwidth carrier based on at least a requirement or a need of the at least one user. Some embodiments further include changing at least a first center frequency for the first uplink flexible bandwidth carrier or a second center frequency for the first downlink flexible bandwidth carrier.

Some embodiments further include transmitting the second scaling factor to a mobile device; and/or transmitting at least a time or a timing period to the mobile device regarding when the bandwidth of the first flexible bandwidth carrier will be adapted from utilizing the first scaling factor to utilizing the second scaling factor. Some embodiments further include eschewing transmitting data to the mobile device during the timing period.

Some embodiments include increasing the bandwidth of the first flexible bandwidth carrier increases a capacity of the first flexible bandwidth carrier. Some embodiments include decreasing the bandwidth of the first flexible bandwidth carrier comprises at least reducing interference with one or more cells, reducing in-band interference, or conserving energy.

Some embodiments include a wireless communications system configured for dynamically adapting flexible bandwidth. The system may include: means for identifying a first scaling factor of a first flexible bandwidth carrier; means for determining a second scaling factor; and/or means for adapting a bandwidth of the first flexible bandwidth carrier from utilizing the first scaling factor to utilizing the second scaling factor.

The means for adapting the bandwidth of the first flexible bandwidth from utilizing the first scaling factor to utilizing the second scaling factor may include means for increasing the bandwidth of the first flexible bandwidth carrier. The means for adapting the bandwidth of the first flexible bandwidth from utilizing the first scaling factor to utilizing the second scaling factor may include means for decreasing the bandwidth of the first flexible bandwidth carrier. Some embodiments further include means for handing over a mobile device camped on the first flexible bandwidth carrier to another bandwidth carrier before decreasing the bandwidth of the first flexible bandwidth carrier.

Some embodiments further include means for adapting a bandwidth of a first downlink flexible bandwidth carrier from utilizing the first scaling factor to utilizing a third scaling factor different from the second scaling factor. The first flexible bandwidth carrier may include a first uplink flexible bandwidth carrier and the second scaling factor and third scaling factor are determined based on one or more traffic patterns for at least the first uplink flexible bandwidth carrier or the first downlink flexible bandwidth carrier. Some embodiments further include means for adapting a bandwidth of a second downlink flexible bandwidth carrier from utilizing the first scaling factor to utilizing a fourth scaling factor; and/or means for adapting a bandwidth of a second uplink flexible bandwidth carrier from utilizing the first scaling factor to utilizing a fifth scaling factor. Some embodiments further include means for coupling at least the first uplink flexible bandwidth carrier with the second downlink carrier or the second uplink flexible bandwidth carrier with the first downlink carrier. Some embodiments further include means for assigning at least one user to at least the first uplink flexible bandwidth carrier, the second uplink flexible bandwidth carrier, the first downlink flexible bandwidth carrier, or the second downlink flexible bandwidth carrier based on at least a requirement or a need of the at least one user. Some embodiments further include means for changing at least a first center frequency for the first uplink flexible bandwidth carrier or a second center frequency for the first downlink flexible bandwidth carrier.

Some embodiments further include means for transmitting the second scaling factor to a mobile device; and/or means for transmitting at least a time or a timing period to the mobile device regarding when the bandwidth of the first flexible bandwidth carrier will be adapted from utilizing the first scaling factor to utilizing the second scaling factor. Some embodiments further include means for eschewing transmitting data to the mobile device during the timing period.

In some embodiments, increasing the bandwidth of the first flexible bandwidth carrier increases a capacity of the first flexible bandwidth carrier. In some embodiments, decreasing the bandwidth of the first flexible bandwidth carrier comprises at least reducing interference with one or more cells, reducing in-band interference, or conserving energy.

Some embodiments include a computer program product for dynamically adapting flexible bandwidth in a wireless communications system that may include a non-transitory computer-readable medium that may include: code for identifying a first scaling factor of a first flexible bandwidth carrier; code for determining a second scaling factor; and code for adapting a bandwidth of the first flexible bandwidth carrier from utilizing the first scaling factor to utilizing the second scaling factor.

The code for adapting the bandwidth of the first flexible bandwidth from utilizing the first scaling factor to utilizing the second scaling factor may include code for increasing the bandwidth of the first flexible bandwidth carrier. The code for adapting the bandwidth of the first flexible bandwidth from utilizing the first scaling factor to utilizing the second scaling factor may include code for decreasing the bandwidth of the first flexible bandwidth carrier. The non-transitory computer-readable medium may further include code for handing over a mobile device camped on the first flexible bandwidth carrier to another bandwidth carrier before decreasing the bandwidth the first flexible bandwidth carrier.

In some embodiments the non-transitory computer-readable medium further includes code for adapting a bandwidth of a first downlink flexible bandwidth carrier from utilizing the first scaling factor to utilizing a third scaling factor different from the second scaling factor. The first flexible bandwidth carrier may include a first uplink flexible bandwidth carrier and the second scaling factor and third scaling factor may be determined based on one or more traffic patterns for at least the first uplink flexible bandwidth carrier or the first downlink flexible bandwidth carrier. The non-transitory computer-readable medium may further include code for adapting a bandwidth of a second downlink flexible bandwidth carrier from utilizing the first scaling factor to utilizing a fourth scaling factor; and/or code for adapting a bandwidth of a second uplink flexible bandwidth carrier from utilizing the first scaling factor to utilizing a fifth scaling factor. The non-transitory computer-readable medium may further include code for coupling at least the first uplink flexible bandwidth carrier with the second downlink carrier or the second uplink flexible bandwidth carrier with the first downlink carrier. The non-transitory computer-readable medium may further include code for assigning at least one user to at least the first uplink flexible bandwidth carrier, the second uplink flexible bandwidth carrier, the first downlink flexible bandwidth carrier, or the second downlink flexible bandwidth carrier based on at least a requirement or a need of the at least one user. In some embodiments, the non-transitory computer-readable medium further includes code for changing at least a first center frequency for the first uplink flexible bandwidth carrier or a second center frequency for the first downlink flexible bandwidth carrier.

In some embodiments, the non-transitory computer-readable medium further includes: code for transmitting the second scaling factor to a mobile device; and/or code for transmitting at least a time or a timing period to the mobile device regarding when the bandwidth of the first flexible bandwidth carrier will be adapted from utilizing the first scaling factor to utilizing the second scaling factor. The non-transitory computer-readable medium may further include eschewing transmitting data to the mobile device during the timing period.

In some embodiments, increasing the bandwidth of the first flexible bandwidth carrier increases a capacity of the first flexible bandwidth carrier. In some embodiments, decreasing the bandwidth of the first flexible bandwidth carrier comprises at least reducing interference with one or more cells, reducing in-band interference, or conserving energy.

Some embodiments include a wireless communications device configured for dynamically adapting flexible bandwidth in a wireless communications system. The device may include at least one processor configured to: identify a first scaling factor of a first flexible bandwidth carrier; determine a second scaling factor; and/or adapt a bandwidth of the first flexible bandwidth carrier from utilizing the first scaling factor to utilizing the second scaling factor. The at least one processor configured to adapt the bandwidth of the first flexible bandwidth from utilizing the first scaling factor to utilizing the second scaling factor may be configured to increase the bandwidth of the first flexible bandwidth carrier. The at least one processor configured to adapt the bandwidth of the first flexible bandwidth from utilizing the first scaling factor to utilizing the second scaling factor may be configured to decrease the bandwidth of the first flexible bandwidth carrier. The at least one processor may be further configured to hand over a mobile device camped on the first flexible bandwidth carrier to another bandwidth carrier before decreasing the bandwidth the first flexible bandwidth carrier.

In some embodiments, the at least one processor is further configured to adapt a bandwidth of a first downlink flexible bandwidth carrier from utilizing the first scaling factor to utilizing a third scaling factor different from the second scaling factor. The first flexible bandwidth carrier may include a first uplink flexible bandwidth carrier and the second scaling factor and third scaling factor are determined based on one or more traffic patterns for at least the first uplink flexible bandwidth carrier or the first downlink flexible bandwidth carrier. The at least one processor is may be further configured to: adapt a bandwidth of a second downlink flexible bandwidth carrier from utilizing the first scaling factor to utilizing a fourth scaling factor; and/or adapt a bandwidth of a second uplink flexible bandwidth carrier from utilizing the first scaling factor to utilizing a fifth scaling factor. The at least one processor may be further configured to couple at least the first uplink flexible bandwidth carrier with the second downlink carrier or the second uplink flexible bandwidth carrier with the first downlink carrier. The at least one processor may be further configured to assign at least one user to at least the first uplink flexible bandwidth carrier, the second uplink flexible bandwidth carrier, the first downlink flexible bandwidth carrier, or the second downlink flexible bandwidth carrier based on at least a requirement or a need of the at least one user. The at least one processor may be further configured to change at least a first center frequency for the first uplink flexible bandwidth carrier or a second center frequency for the first downlink flexible bandwidth carrier.

In some embodiments the at least one processor is further configured to: transmit the second scaling factor to a mobile device; and/or transmit at least a time or a timing period to the mobile device regarding when the bandwidth of the first flexible bandwidth carrier will be adapted from utilizing the first scaling factor to utilizing the second scaling factor. The at least one processor may be further configured to eschewing transmitting data to the mobile device during the timing period.

In some embodiments, increasing the bandwidth of the first flexible bandwidth carrier increases a capacity of the first flexible bandwidth carrier. In some embodiments, decreasing the bandwidth of the first flexible bandwidth carrier comprises at least reducing interference with one or more cells, reducing in-band interference, or conserving energy.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
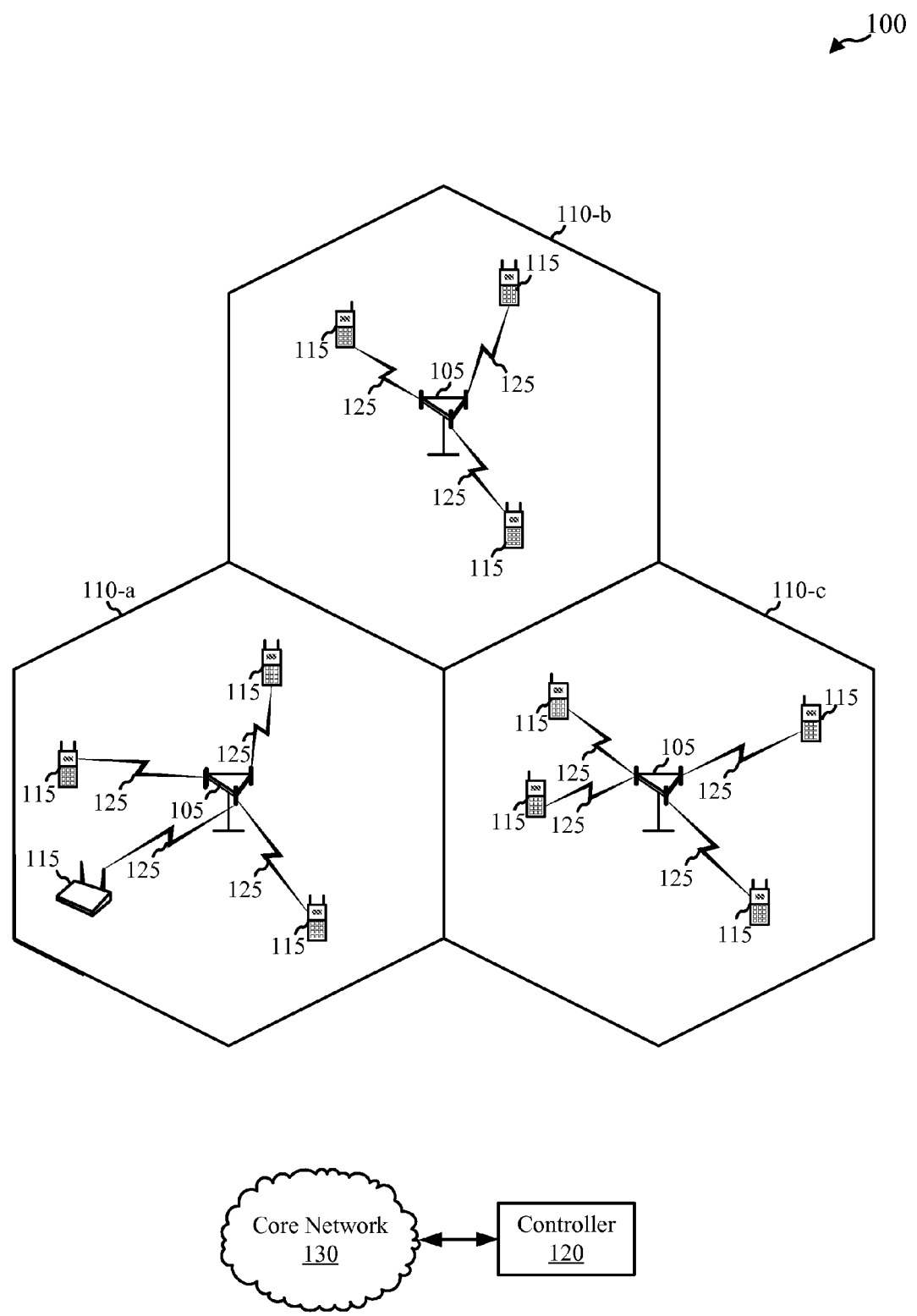
FIG. 1 shows a block diagram of a wireless communications system in accordance with various embodiments.

Methods, systems, and devices are provided for dynamically adjusting bandwidth for flexible bandwidth carriers that may be utilized in macrocell deployments. For macrocellular flexible bandwidth systems, some deployments may be in separate carrier frequencies from existing normal cellular carriers; these flexible bandwidth carriers may be adjacent to the normal cellular carriers. To increase capacity, flexible bandwidth carriers may be placed closer to the normal cellular carriers (e.g., UMTS/DO carriers). This may lead to significant adjacent carrier interference for both the flexible bandwidth carrier and the existing cellular carrier. In addition, regular cellular carriers (e.g., UMTS/DO) generally have fixed bandwidths that may typically lead to inefficient bandwidth usage and significant network energy consumption.

Methods, systems, and devices are provided that may address these problems through dynamically adapting the bandwidth of a flexible bandwidth carrier by dynamically changing the scale factor of the flexible bandwidth signal based on information such as traffic patterns, interference measurements, etc.

For example, in a macrocellular deployment, the bandwidth of a flexible bandwidth signal may be increased through dynamically decreasing a scaling factor of the flexible bandwidth signal. Increasing the bandwidth of the flexible bandwidth signal may be utilized to increase network capacity of the carrier. The bandwidth of a flexible bandwidth signal may be decreased through dynamically increasing the scaling factor of the flexible system. This may be utilized to achieve purposes such as reducing the interference to other cells and/or reducing in-band interference. In some embodiments, a flexible bandwidth carrier may be utilized to conserve energy. For example, an overlay flexible bandwidth carrier may reduce its bandwidth or even turn off when its traffic is low and then turn back on when the traffic increases in neighboring cells. Before a flexible bandwidth carrier reduces its bandwidth or powers off, the mobile devices camped on the flexible bandwidth carrier may be moved to an underlay flexible or normal bandwidth carrier. The underlay carrier and the overlay carrier may be co-located or non-co-located. In some cases, the mobile device may remain on the overlay flexible bandwidth carrier, while no data may be scheduled for transmission while the overlay flexible bandwidth carrier changes its bandwidth or is powered off.

In some embodiments, the uplink and downlink bandwidths of a flexible bandwidth carrier may be dynamically adjusted either jointly or independently. Information such as traffic patterns may be utilized to determine how to dynamically adjust the uplink and/or downlink bandwidths of a flexible bandwidth carrier. In some cases, the bandwidth of the downlink carrier bandwidth may be decreased while the uplink carrier bandwidth is increased or held constant. The channel numbers may also be dynamically changed such that the center frequency for uplink and/or downlink bandwidth carriers may be dynamically changed.

Flexible bandwidth carriers and/or waveforms for wireless communications systems may utilize portions of spectrum that may not be big enough to fit a normal waveform utilizing flexible waveforms. A flexible bandwidth system may be generated with respect to a normal bandwidth system through dilating, or scaling down, the time or the chip rate of the flexible bandwidth system with respect to the normal bandwidth system. Some embodiments may increase the bandwidth of a waveform through expanding, or scaling up, the time or the chip rate of the flexible bandwidth system.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above, as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, mobile devices 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The mobile devices 115 may be any type of mobile station, mobile device, access terminal, subscriber unit, or user equipment. The mobile devices 115 may include cellular phones and wireless communications devices, but may also include personal digital assistants (PDAs), smartphones, other handheld devices, netbooks, notebook computers, etc. Thus, the term mobile device should be interpreted broadly hereinafter, including the claims, to include any type of wireless or mobile communications device.

The base stations 105 may wirelessly communicate with the mobile devices 115 via a base station antenna. The base stations 105 may be configured to communicate with the mobile devices 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the mobile devices 115, the base stations 105, the core network 130, and/or the controller 120 may be configured to utilize flexible bandwidth and waveforms in accordance with various embodiments. System 100, for example, shows transmissions 125 between mobile devices 115 and base stations 105. The transmissions 125 may include uplink and/or reverse link transmission, from a mobile device 115 to a base station 105, and/or downlink and/or forward link transmissions, from a base station 105 to a mobile device 115. The transmissions 125 may include flexible and/or normal waveforms. Normal waveforms may also be referred to as legacy and/or normal waveforms.

The different aspects of system 100, such as the mobile devices 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the mobile devices 115, the base stations 105, the core network 130, and/or the controller 120 may be configured to adapt the chip rates, spreading factor, and/or scaling factors to generate and/or utilize flexible bandwidth and/or waveforms. Some aspects of system 100 may form a flexible subsystem (such as certain mobile devices 115 and/or base stations 105) that may be generated with respect to a normal subsystem (that may be implemented using other mobile devices 115 and/or base stations 105) through dilating, or scaling down, the time of the flexible subsystem with respect to the time of the normal subsystem.

In some embodiments, different aspects of system 100, such as the mobile devices 115, the base stations 105, the core network 130, and/or the controller 120 may be configured for dynamically adapting flexible bandwidth in accordance with various embodiments. For example, transmissions 125 between a mobile device 115 and a base station 105 may utilize flexible bandwidth that may be dynamically adapted. The scale factor of the flexible bandwidth signal associated with transmissions 125 may be dynamically adjusted. These adjustments may be made based on information such as traffic patterns, interference measurements, etc.

For example, within system 100, the bandwidth of a flexible bandwidth signal may be increased through dynamically decreasing a scaling factor of the flexible bandwidth signal. Increasing the bandwidth of the flexible bandwidth signal may be utilized to increase network capacity of the carrier. The bandwidth of a flexible bandwidth signal may be decreased through dynamically increasing the scaling factor of the flexible system. This may be utilized to achieve purposes such as reducing the interference to other cells and/or reducing in-band interference. In some embodiments, a flexible bandwidth carrier may be utilized to conserve energy within system 100. For example, an overlay flexible bandwidth carrier may reduce its bandwidth or even turn off when its traffic is low and then turn back on when the traffic increases in neighboring cells. Before a flexible bandwidth carrier reduces its bandwidth or powers off, the mobile devices 115 camped on the flexible bandwidth carrier associated with a base station 105 may be moved to an underlay flexible or normal bandwidth carrier. The underlay carrier and the overlay carrier may be co-located or non-co-located. In some cases, the mobile device 115 may remain on the overlay flexible bandwidth carrier, while no data may be scheduled for transmission while the overlay flexible bandwidth carrier changes its bandwidth or is powered off.

In some embodiments, the uplink and downlink bandwidths of a flexible bandwidth carrier associated with a base station 105 and/or mobile device 115 may be dynamically adjusted either jointly or independently. Information such as traffic patterns within system 100 may be utilized to determine how to dynamically adjust the uplink and/or downlink bandwidths of a flexible bandwidth carrier. In some cases, the bandwidth of the downlink carrier bandwidth may be decreased while the uplink carrier bandwidth is increased or held constant. The channel numbers may also be dynamically changed such that the center frequency for uplink and/or downlink bandwidth carriers may be dynamically changed.

Figure 2A:
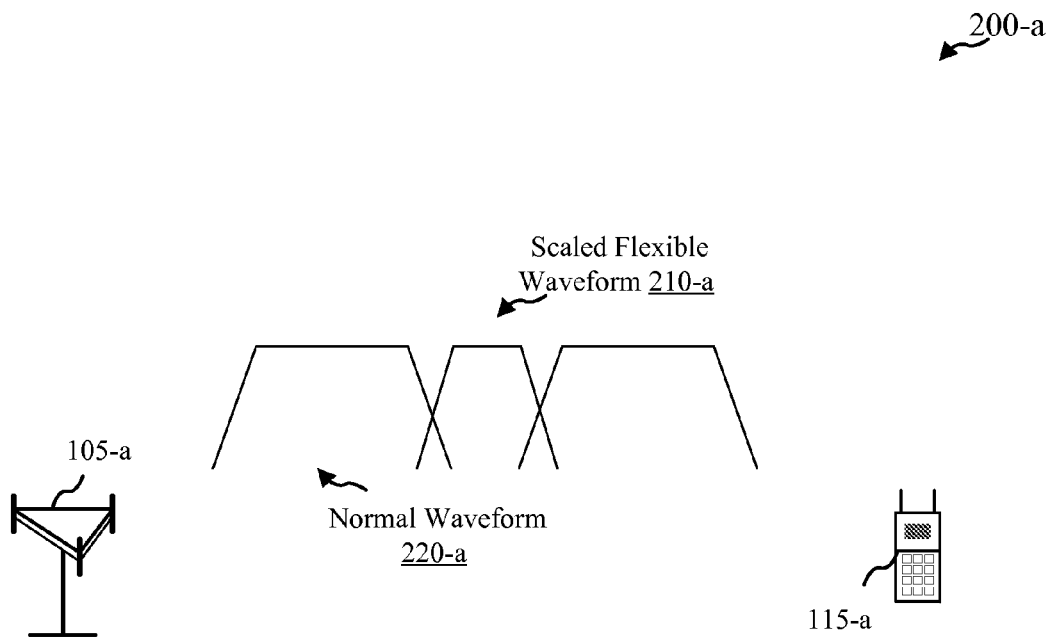
FIG. 2A shows an example of a wireless communications system where a flexible waveform fits into a portion of spectrum not broad enough to fit a normal waveform in accordance with various embodiments.
Figure 2B:
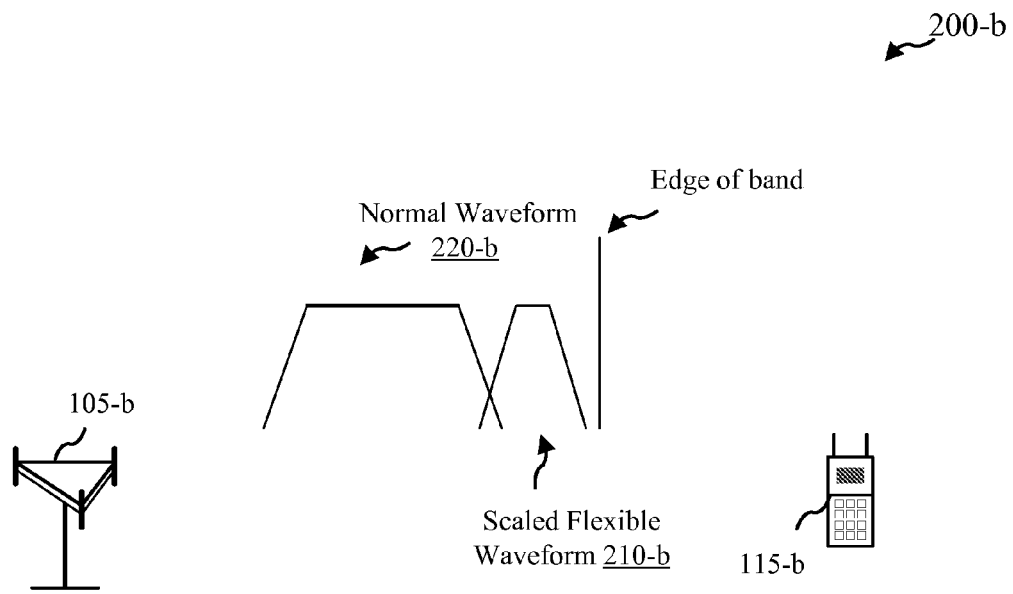
FIG. 2B shows an example of a wireless communications system where a flexible waveform fits into a portion of spectrum near an edge of a band in accordance with various embodiments.

FIG. 2A shows an example of a wireless communications system 200-a with a base station 105-a and a mobile device 115-a in accordance with various embodiments, where a flexible waveform 210-a fits into a portion of spectrum not broad enough to fit a normal waveform 220-a. System 200-a may be an example of system 100 of FIG. 1. In some embodiments, the flexible waveform 210-a may overlap with the normal waveform 220-a that either the base 105-a and/or the mobile device 115-a may transmit. In some cases, the normal waveform 220-a may completely overlap the flexible waveform 210-a. Some embodiments may also utilize multiple flexible waveforms 210. In some embodiments, another base station and/or mobile device (not shown) may transmit the normal waveform 220-a and/or the flexible waveform 210-a. FIG. 2B shows an example of a wireless communications system 200-b with a base station 105-b and mobile device 115-b, where a flexible waveform 210-b fits into a portion of spectrum near an edge of a band, which may be a guard band, where normal waveform 220-b may not fit. System 200-b may be an example of system 100 of FIG. 1. Mobile devices 115-a/115-b and/or base stations 105-a/105-b may be configured to dynamically adjust the bandwidth of the flexible waveforms 210-a/210-b in accordance with various embodiments.

Figure 2C:
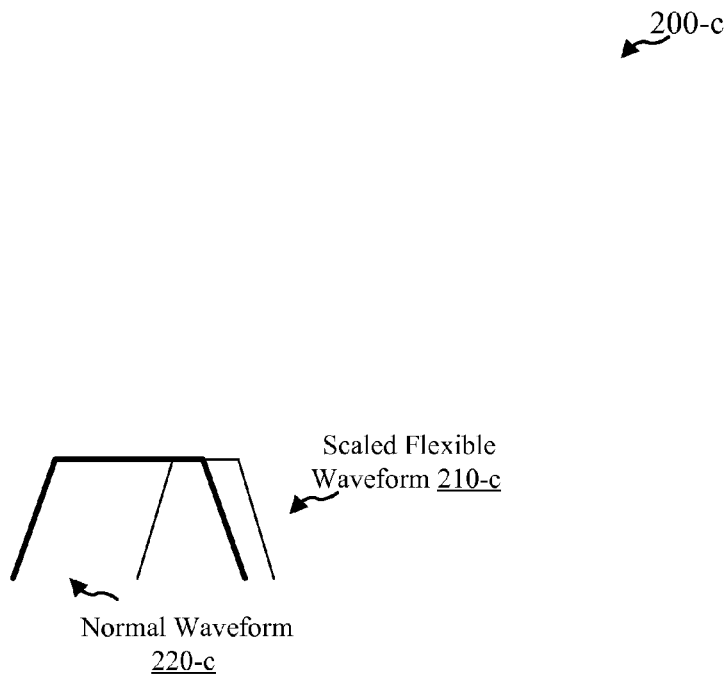
FIG. 2C shows an example of a wireless communications system where a flexible waveform partially overlaps a normal waveform in accordance with various embodiments.
Figure 2D:
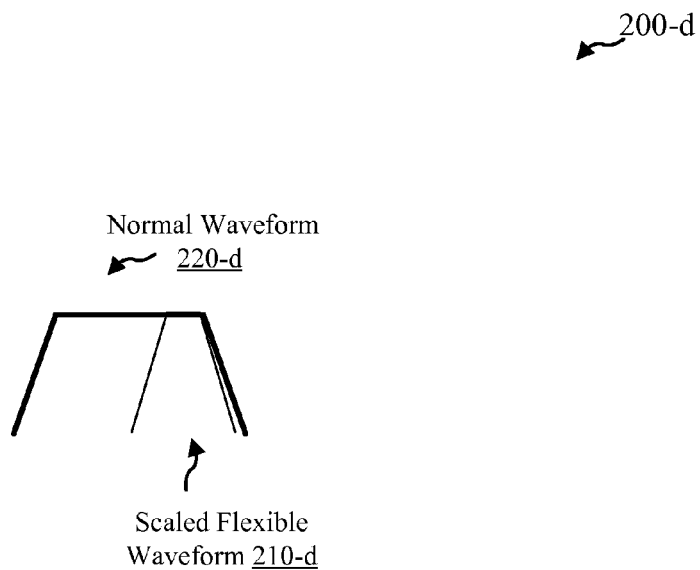
FIG. 2D shows an example of a wireless communications system where a flexible waveform is completely overlapped by a normal waveform in accordance with various embodiments.
Figure 2E:
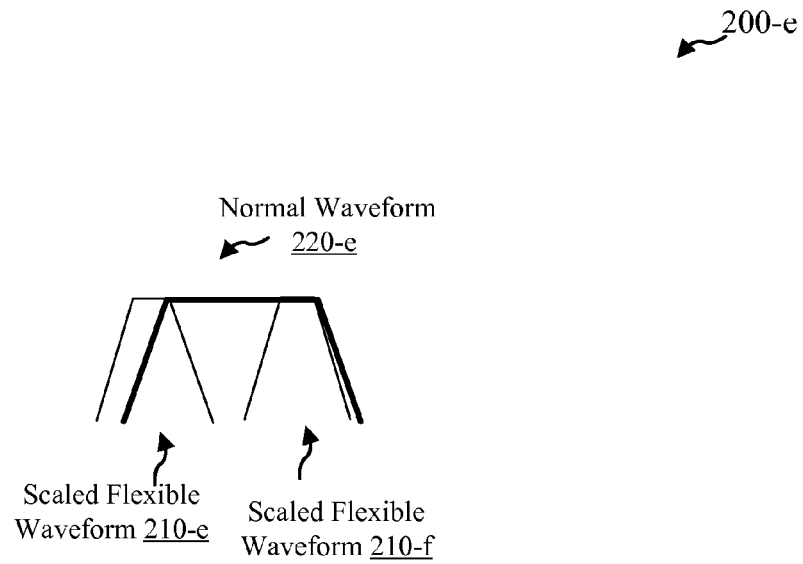
FIG. 2E shows an example of a wireless communications system where one flexible waveform is completely overlapped by a normal waveform and another flexible waveform partially overlaps a normal waveform in accordance with various embodiments.
Figure 2F:
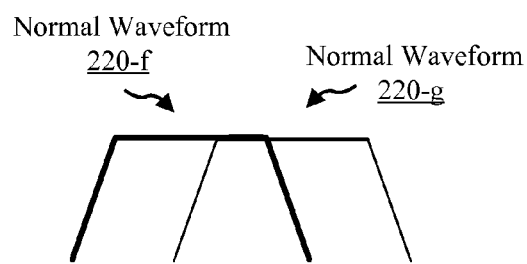
FIG. 2F shows an example of a wireless communications system where one normal waveform partially overlaps another normal waveform in accordance with various embodiments.

FIG. 2C shows an example of a wireless communications system 200-c where a flexible waveform 210-c partially overlaps a normal waveform 220-c in accordance with various embodiments. System 200-c may be an example of system 100 of FIG. 1. FIG. 2D shows an example of a wireless communications systems 200-d where a flexible waveform 210-d is completely overlapped by a normal waveform 220-d in accordance with various embodiments. System 200-d may be an example of system 100 of FIG. 1. FIG. 2E shows an example of a wireless communications system 200-e where one flexible waveform 210-f is completely overlapped by a normal waveform 220-e and another flexible waveform 210-e partially overlaps the normal waveform 220-e in accordance with various embodiments. System 200-e may be an example of system 100 of FIG. 1. FIG. 2F shows an example of a wireless communications system 200-f where one normal waveform 220-f partially overlaps another normal waveform 220-g in accordance with various embodiments. System 200-f may be an example of system 100 of FIG. 1. Systems 200-c, 200-d, 200-e, and/or 200-f may be configured such that the bandwidth of the flexible waveforms 210-c, 210-d, and/or 210-e may be dynamically adjusted in accordance with various embodiments.

In general, a first waveform or carrier bandwidth and a second waveform or carrier bandwidth may partially overlap when they overlap by at least 1%, 2%, and/or 5%. In some embodiments, partial overlap may occur when the overlap is at least 10%. In some embodiments, the partial overlap may be less than 99%, 98%, and/or 95%. In some embodiments, the overlap may be less than 90%. In some cases, a flexible waveform or carrier bandwidth may be contained completely within another waveform or carrier bandwidth such as seen in system 200-d of FIG. 2. This overlap still reflects partial overlap, as the two waveforms or carrier bandwidths do not completely coincide. In general, partial overlap can mean that the two or more waveforms or carrier bandwidths do not completely coincide (i.e., the carrier bandwidths are not the same).

Some embodiments may utilize different definitions of overlap based on power spectrum density (PSD). For example, one definition of overlap based on PSD is shown in the following overlap equation for a first carrier:

$$\text{overlap} = 100\% * \frac{\int_0^\infty PSD_1(f) * PSD_2(f)}{\int_0^\infty PSD_1(f) * PSD_1(f)}.$$

In this equation, $PSD_1(f)$ is the PSD for a first waveform or carrier bandwidth and $PSD_2(f)$ is the PSD for a second waveform or carrier bandwidth. When the two waveforms or carrier bandwidths coincide, then the overlap equation may equal 100%. When the first waveform or carrier bandwidth and the second waveform or carrier bandwidth at least partially overlap, then the overlap equation may not equal 100%. For example, the Overlap Equation may result in a partial overlap of greater than or equal to 1%, 2%, 5%, and/or 10% in some embodiments. The overlap equation may result in a partial overlap of less than or equal to 99%, 98%, 95%, and/or 90% in some embodiments. One may note that in the case in which the first waveform or carrier bandwidth is a normal waveform or carrier bandwidth and the second waveform or a carrier waveform is a flexible waveform or carrier bandwidth that is contained within the normal bandwidth or carrier bandwidth, then the overlap equation may represent the ratio of the flexible bandwidth compared to the normal bandwidth, written as a percentage. Furthermore, the overlap equation may depend on which carrier bandwidth's perspective the overlap equation is formulated with respect to. Some embodiments may utilize other definitions of overlap. In some cases, another overlap may be defined utilizing a square root operation such as the following:

$$\text{overlap} = 100\% * \sqrt{\frac{\int_0^\infty PSD_1(f) * PSD_2(f)}{\int_0^\infty PSD_1(f) * PSD_1(f)}}.$$

Other embodiments may utilize other overlap equations that may account for multiple overlapping carriers.

Figure 3:
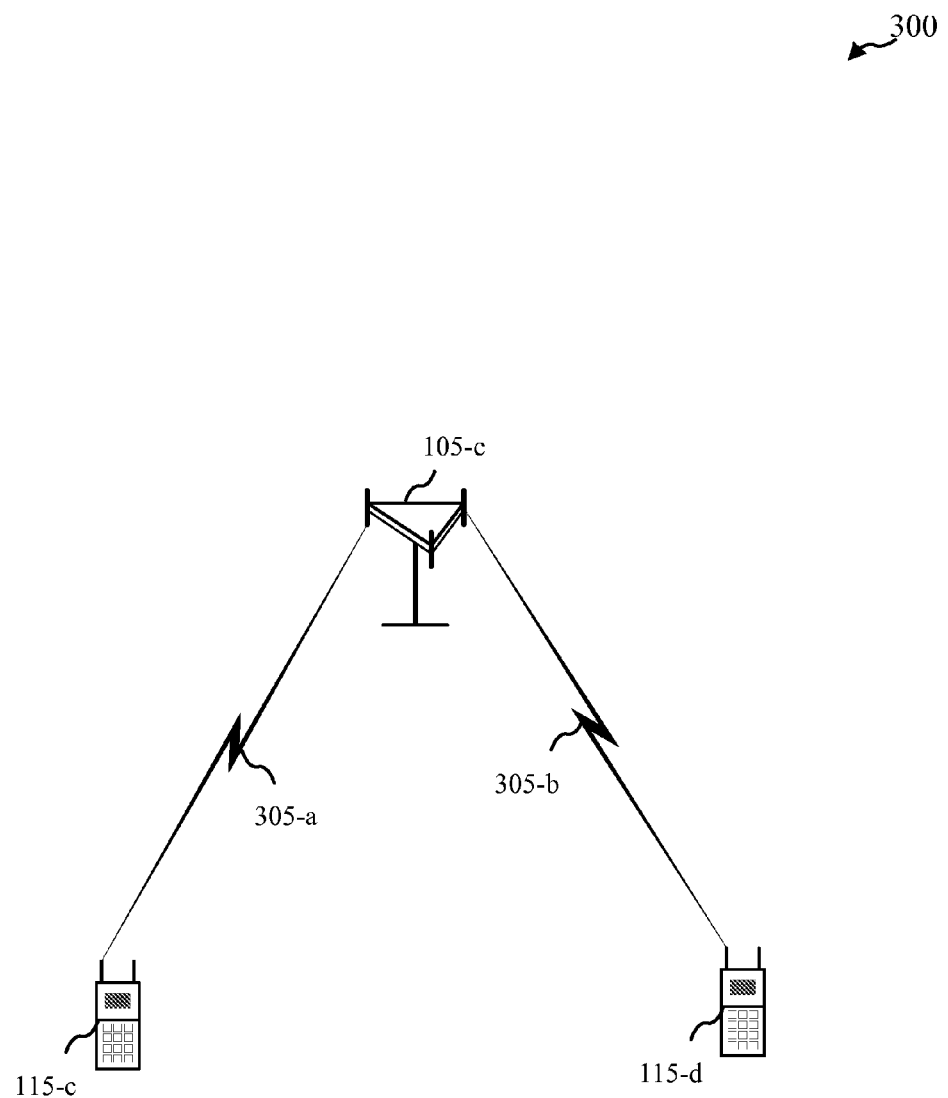
FIG. 3 shows a block diagram of a wireless communications system in accordance with various embodiments.

FIG. 3 shows a wireless communications system 300 with a base station 105-c and mobile devices 115-c and 115d, in accordance with various embodiments. In some embodiments, the base station 105-c may be configured for dynamically adapting flexible bandwidth within system 300. For example, transmissions 305-a and/or 305-b between the mobile device 115-c/115-d and the base station 105-a may utilize bandwidth of a flexible waveform that may be dynamically adapted. The base station 105-c and/or mobile devices 115-c and/or 115-d may adapted to the bandwidth of transmissions 305-a and/or 305-b through changing one or more scaling factors. These changes may be made based on information such as traffic patterns, interference measurements, etc., for example.

The bandwidth of 305-a and/or 305-b may be increased through dynamically decreasing a scaling factor of the flexible bandwidth signal. Increasing the bandwidth of the 305-a and/or 305-b may be utilized to increase network capacity of the carrier. The bandwidth of 305-a and/or 305-b may be decreased through dynamically increasing the scaling factor of the flexible system. This may be utilized to achieve purposes such as reducing the interference to other cells and/or reducing in-band interference. In some embodiments, an adapted flexible bandwidth carrier may be utilized to conserve energy within system 100. For example, an overlay flexible bandwidth carrier may reduce its bandwidth or even turn off when its traffic is low and then turn back on when the traffic increases in neighboring cells. Before a flexible bandwidth carrier reduces its bandwidth or powers off, the mobile devices 115-c/115-d camped on the flexible bandwidth carrier associated with a base station 105-c may be moved to an underlay flexible or normal bandwidth carrier. The underlay carrier and the overlay carrier may be co-located or non-co-located. In some cases, the mobile devices 115-c/115-d may remain on the overlay flexible bandwidth carrier, while no data may be scheduled for transmission while the overlay flexible bandwidth carrier changes its bandwidth or is powered off.

In some embodiments, as part of transmissions 305-a and/or 305-b, the uplink and downlink bandwidths of a flexible bandwidth carrier associated with a base station 105-c and/or mobile devices 115-c/115-d may be dynamically adjusted either jointly or independently. Information such as traffic patterns within system 300 may be utilized to determine how to dynamically adjust the uplink and/or downlink bandwidths of a flexible bandwidth carrier. In some cases, the bandwidth of the downlink carrier bandwidth may be decreased while the uplink carrier bandwidth is increased or held constant. The channel numbers may also be dynamically changed such that the center frequency for uplink and/or downlink bandwidth carriers may be dynamically changed.

Transmissions 305-a and/or 305-b between the mobile devices 115-c/115-d and the base station 105-a may utilize flexible waveforms that may be generated to occupy less (or more) bandwidth than a normal waveform. For example, at a band edge, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a scaling factor N with respect to a normal waveform. Scaling factor N may take on numerous different values including, but not limited to, integer values such as 1, 2, 3, 4, 8, etc. N, however, does not have to be an integer.

Some embodiments may utilize additional terminology. A new unit D may be utilized. The unit D is dilated. The unit is unitless and has the value of N. One can talk about time in the flexible system in terms of "dilated time". For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds". Note frequency in Hertz is 1/s.

As discussed above, a flexible waveform may be a waveform that occupies less bandwidth than a normal waveform. Thus, in a flexible bandwidth system, the same number of symbols and bits may be transmitted over a longer duration compared to normal bandwidth system. This may result in time stretching, whereby slot duration, frame duration, etc., may increase by a scaling factor N. Scaling factor N may represent the ratio of the normal bandwidth to flexible bandwidth (BW). Thus, data rate in a flexible bandwidth system may equal (Normal Rate×1/N), and delay may equal (Normal Delay×N). In general, a flexible systems channel BW=channel BW of normal systems/N. Delay×BW may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a scaling factor that may be not equal to one (e.g., N=2, 4, 8, ½, ¼, etc.). For N>1, or if a chip rate is decreased, the bandwidth of a waveform may decrease. Some embodiments may utilize scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

Some embodiments provide for variable scaling factors for macrocellular deployments. Variable scaling factors may include dynamically adjusting one or more scaling factors for a flexible bandwidth system. Variable scaling factors may be utilized for a variety of purposes including, but not limited to, increasing capacity, interference mitigation and avoidance, and/or energy savings. Some embodiments provide for variable scaling factors for uplink and/or downlink applications.

Figure 4:
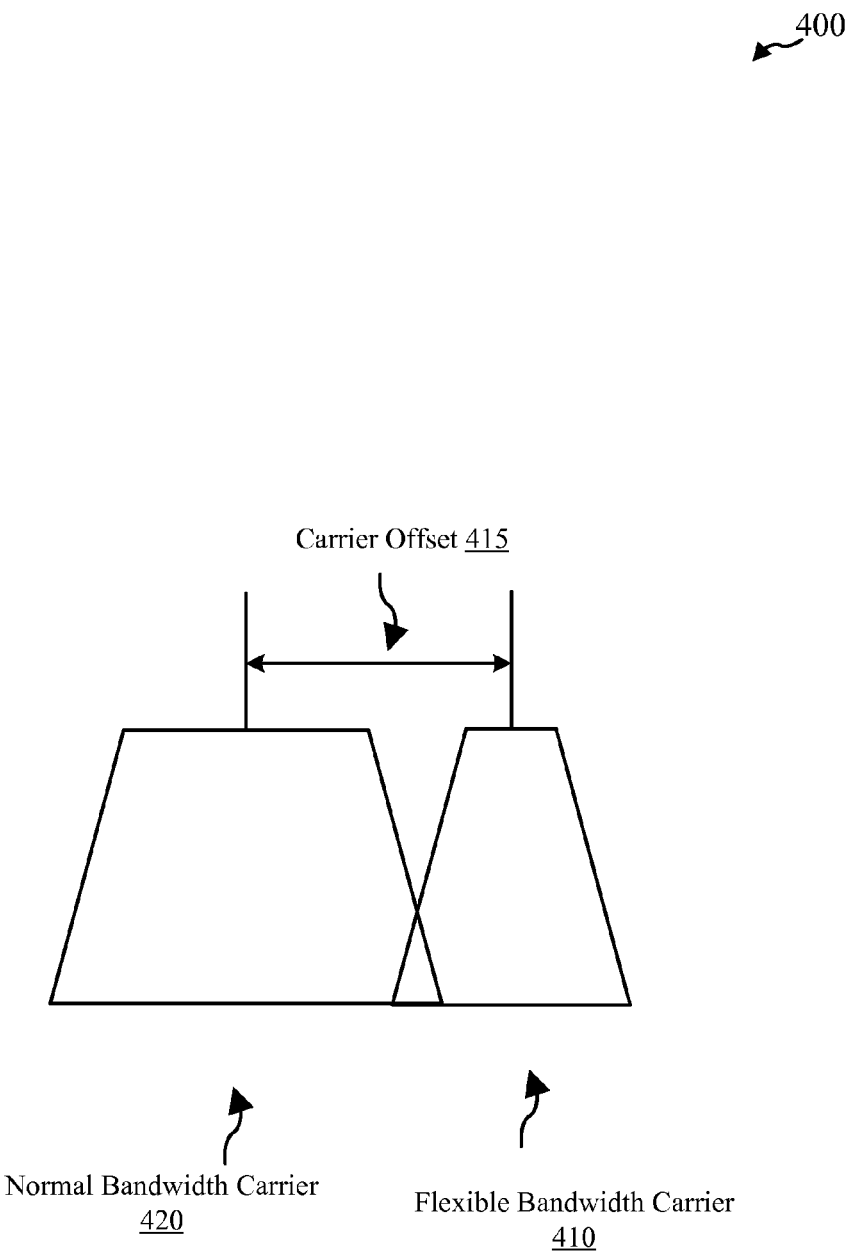
FIG. 4 shows a carrier system in accordance with various embodiments.

As discussed above in more detail, a scaling factor, N, may represent a flexible bandwidth reduction factor such that N=1 represents a regular cellular carrier and N>1 (or N<1 in some cases) may represents the flexible bandwidth signal. For macrocell deployment, the normal and flexible bandwidth carriers may be separated by carrier offset (CO). For example, FIG. 4 shows a carrier system 400 that includes a normal bandwidth carrier 420 separated from a flexible bandwidth carrier 410 by carrier offset 415. As shown in FIG. 2, the amount of overlap between a normal bandwidth carrier (or other flexible bandwidth carrier) and a flexible bandwidth carrier and/or the width of each bandwidth carrier may vary, thus result in different carrier offsets. In some deployments, a neighboring cell to a flexible bandwidth carrier may also be another flexible bandwidth carrier.

Embodiments are provided for adapting the bandwidth of a flexible bandwidth carrier. Some embodiments include dynamically adapting the bandwidth of a flexible bandwidth carrier by changing the scale factor of the flexible bandwidth signal based on information such as traffic patterns, interference measurements, etc.

Figure 5A:
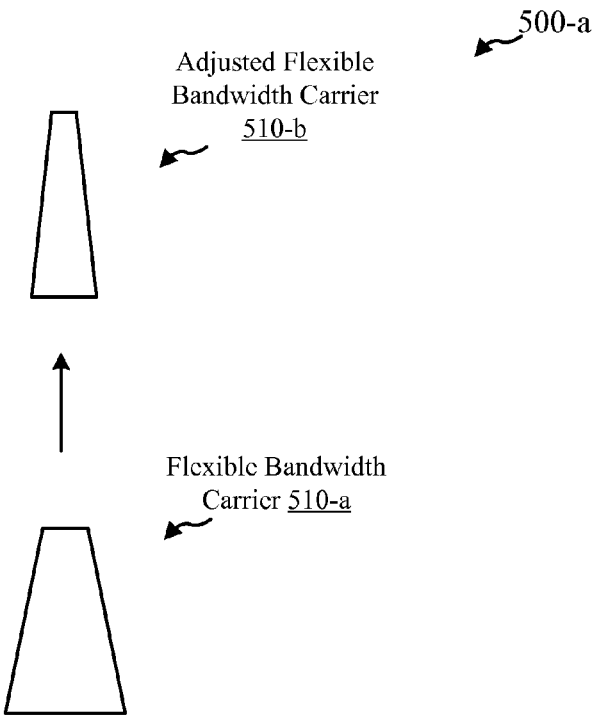
FIG. 5A shows a bandwidth carrier diagram in accordance with various embodiments.
Figure 5B:
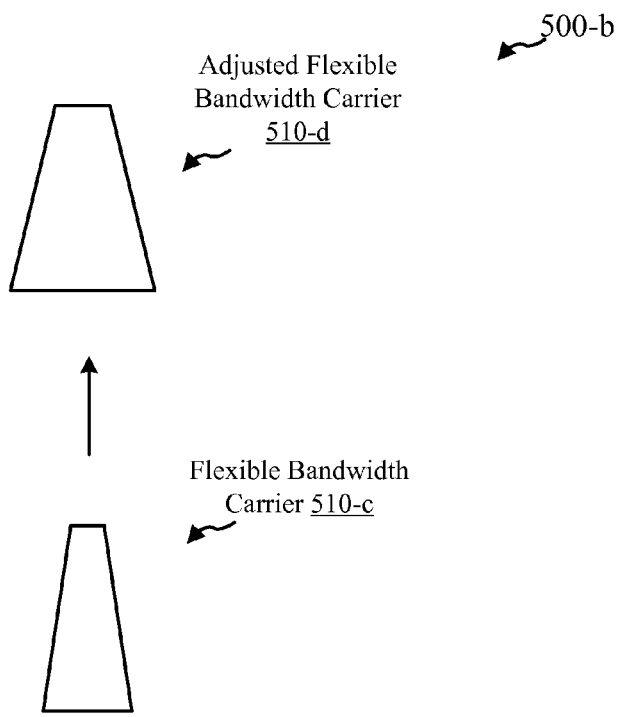
FIG. 5B shows a bandwidth carrier diagram in accordance with various embodiments.

The bandwidth of a flexible bandwidth signal may be adjusted for several reasons. In some situations, the bandwidth of a flexible bandwidth signal may be decreased. FIG. 5A, for example, shows a bandwidth carrier diagram 500-a where a flexible bandwidth carrier 510-a may be adjusted such that the bandwidth decreases, resulting in an adjusted flexible bandwidth carrier 510-b. In this example, the flexible bandwidth carrier 510-a may have a scaling factor N associated with it, while the adjusted bandwidth carrier 510-b may have a scaling factor M associated with it, where M<N. Decreasing the bandwidth of a flexible bandwidth signal may reduce the interference to other cells. For example, if there are indications that the flexible bandwidth carrier may be causing interference to neighboring cells, the bandwidth may be decreased to reduce the interference to other carriers; in some situations, the interference to the neighboring cells may have been significant. In scenarios where the flexible bandwidth signal might be overlapping a normal bandwidth carrier, the bandwidth can be reduced to reduce the overlap region. Decreasing the bandwidth of a flexible bandwidth signal may reduce in-band interference. For example, if a flexible bandwidth cell may be experiencing interference from a neighboring cell (which may be significant in some cases), it may reduce its own bandwidth in order to increase the quality of service (QoS) experienced by its own mobile devices or UEs. Decreasing the bandwidth of a flexible bandwidth signal may conserve energy. For example, if the capacity on certain carriers may not be required, then, the bandwidth of such carriers may be reduced and/or carriers powered off to reduce the power consumption on those carriers. In some embodiments, the bandwidth of a flexible bandwidth signal may be adjusted to increase the bandwidth of a flexible bandwidth signal to increase capacity on the carrier. Based on historical data or other information, the operator might be able to predict hours when there would be an increase in traffic on the network so that a bandwidth increase can be scheduled to accommodate such traffic for example. Once the traffic reduces, then the bandwidth of the flexible bandwidth may be reduced again. FIG. 5B, for example, shows a bandwidth carrier diagram 500-b where a flexible bandwidth carrier 510-c may be adjusted such that the bandwidth increases resulting in an adjusted flexible bandwidth carrier 510-d. In this example, the flexible bandwidth carrier 510-c may have a scaling factor N=P associated with it, while the adjusted bandwidth carrier 510-d may have a scaling factor N=Q associated with it, where P<Q.

Merely by way of example, compared to legacy Release 99 systems (without flexible bandwidth carriers) where the bandwidth of the carrier is generally static, flexible bandwidth systems may produce dynamic bandwidth by varying the scaling factor N value at a base station. In some cases, the scaling factor N may be varied at a mobile device. Compared to LTE-based system (without flexible bandwidth carriers) where subcarriers are generally used to dynamically change the bandwidth, the flexible bandwidth systems may utilize a CDMA-based system with the ability to adjust its transmission bandwidth.

In some embodiments, bandwidth change can be triggered by a variety of different factors. For example, bandwidth changes may be triggered using one or more specific times. Some specific times may be extracted from traffic profiling and utilized to configure low-load periods with associated scaling factors. Bandwidth changes may be triggered by one or more offloading requests from neighboring cells. A bandwidth change may be triggered by reception of significant service requests from flexible bandwidth mobile devices that may potentially lead to an overload scenario. A bandwidth change may be triggered by a mobile device's request for higher QoS than is currently supported in the fractional bandwidth carrier.

Changing bandwidth for a flexible bandwidth system may be utilized for interference reduction and/or avoidance. A flexible bandwidth carrier may estimate that its own mobile devices or neighboring mobile devices may be experiencing high interference and then adapt its bandwidth to address the interference problem. Certain triggers may be utilized to facilitate this process. A bandwidth change may be triggered by a significant number of service requests from mobile devices previously in neighboring carriers indicating high interference in those cells, for example. A bandwidth change may be triggered by poor QoS for mobile devices connected to flexible bandwidth carrier (e.g., high BLER) indicating the high interference from neighboring cells, for example. A bandwidth change may be triggered by an interference reduction request from neighboring cells.

Figure 6:
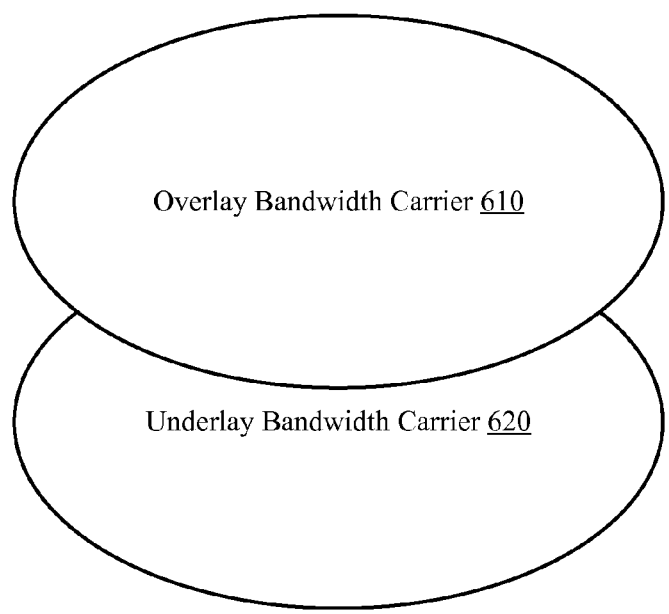
FIG. 6 shows a wireless communications system in accordance with various embodiments.

Changing bandwidth for a flexible bandwidth system may also be utilized for energy savings. For example, some embodiments include an overlay flexible bandwidth carrier that reduces its bandwidth or turns off when traffic is low and turns back on when the traffic increases in neighboring cells. In some situations, before a flexible bandwidth carrier reduces its bandwidth or powers off, mobile devices would be moved from the carrier to an underlay bandwidth carrier; the underlay bandwidth carrier may be a flexible or normal bandwidth carrier. The underlay carrier may have different flexible bandwidth from the overlay. As long as the mobile devices can support the bandwidth on the underlay cells, the overlay cell may be allowed to power off. FIG. 6 shows a wireless communications system diagram 600 that includes both an overlay bandwidth carrier 610 and an underlay bandwidth carrier 620. Typically, the overlay bandwidth carrier 610 includes a flexible bandwidth carrier. The underlay bandwidth carrier 620 may be a normal bandwidth carrier or a flexible bandwidth carrier. An underlay bandwidth carrier 620 may be co-located or non co-located with the overlay bandwidth carrier. In non co-located scenarios, multiple carriers may be required to support the coverage area of the overlay cell. The underlay bandwidth carrier 620 may send power on request to the overlay bandwidth carrier 610. The underlay bandwidth carrier 620 might, in certain cases, have to increase its bandwidth to accommodate mobile devices from the powered-off or reduced bandwidth overlay bandwidth carrier 610.

Figure 7A:
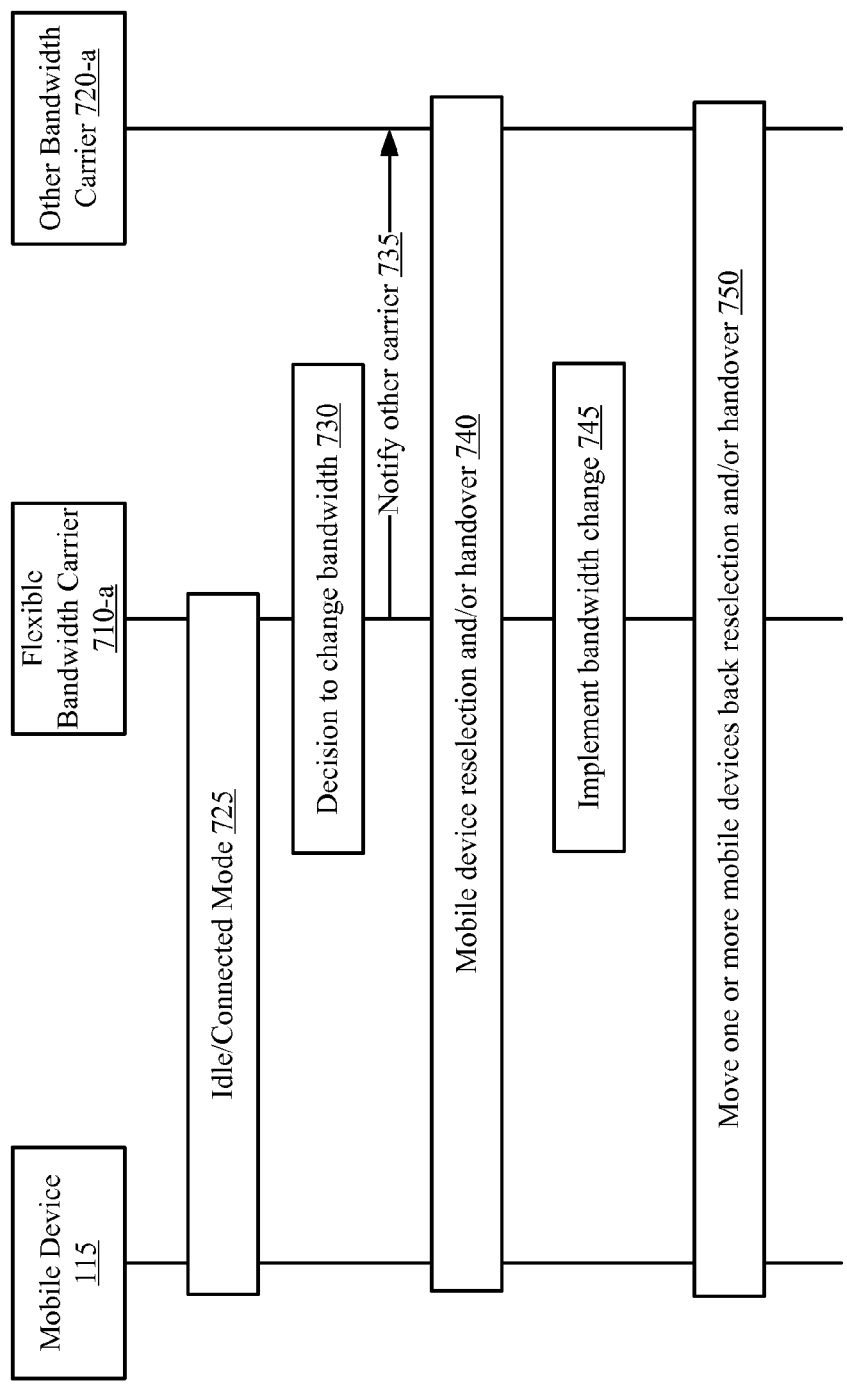
FIG. 7A shows a system communications diagram in accordance with various embodiments.

Turning now to FIG. 7A, a system communications diagram 700-a shows one possible procedure for changing bandwidth in accordance with various embodiments. A mobile device 115 may be in an idle or connected mode, for example, with flexible bandwidth carrier 710 as shown at block 725. Flexible bandwidth carrier 710 may be associated with a base station 105 and/or controller 120 as seen in FIG. 100, for example. A bandwidth change may be triggered based on a variety of different factors including, but not limited to, capacity, interference mitigation and/or avoidance, and/or network energy savings criteria as discussed herein. Block 730 reflects that a decision to change bandwidth may be made. While this may be made at a base station, in some situations, a mobile device, controller, and/or network may make this decision as shown in FIG. 1, for example. Once triggered, one or more aspects of the system may coordinate the change in bandwidth, or change in scaling factor N. For example, a radio access network (RAN) entity such as the radio network controller (RNC) co-ordinate changes in N. In some cases, the RNC may be part of a base station 105, as shown in FIG. 1, for example. The trigger to change bandwidth may be received as either a message or based on time in some cases. For example, another bandwidth carrier 720 may be notified 735 by flexible bandwidth carrier 710. The other bandwidth carrier 720 may be a normal bandwidth carrier or a flexible bandwidth carrier. The scaling factor N that may be utilized to change the bandwidth may be determined. In some cases, this adapted scaling factor may be signaled to a base station if the base station itself does not determine the adapted scaling factor.

Some embodiments can mitigate the impact of bandwidth change on the mobile devices in a variety of ways. For example, broadcast channel (BCCH) modification information may be utilized. As shown in the system communications diagram 700-a, one or more other bandwidth carriers may be notified 735 that a bandwidth change may occur for the flexible bandwidth carrier. In some cases, messages may be broadcast to mobile devices to change bandwidth. A mobile device could update the change when it wakes in some cases. One or more mobile devices 115 may be handed over and/or reselected to one of the other bandwidth carriers as shown in block 740. The bandwidth change may be implemented as shown in block 745. The mobile device 115 may be moved back after the change as shown in block 750. In some cases, system information may be modified to facilitate re-selection to other cells and back to cell after change.

In some embodiments, the base station may receive a bandwidth change request from a network device, such as RAN. The base station may implement the bandwidth change, as shown in block 745, and report back to the network once the change has been completed. In some cases, the mobile devices may be moved over to the flexible bandwidth carrier after the bandwidth change as shown in block 750.

Embodiments may provide more flexibility and granularity than other forms of communications systems because the flexible scale factor may take on numerical values not available to systems that are limited to integral numbers of subcarriers.

In some embodiments, the flexible bandwidth carrier 710-a may transmit to mobile device 115 at least a time or a timing period to the mobile device regarding when the bandwidth of the flexible bandwidth carrier 710-a will be adapted from utilizing one scaling factor to utilizing another scaling factor. Transmitting data to the mobile device 115 may be eschewed, avoided, and/or not scheduled during the timing period. In this case, the mobile device 115 may not need to be moved over to the other bandwidth carrier 710-b.

Figure 7B:
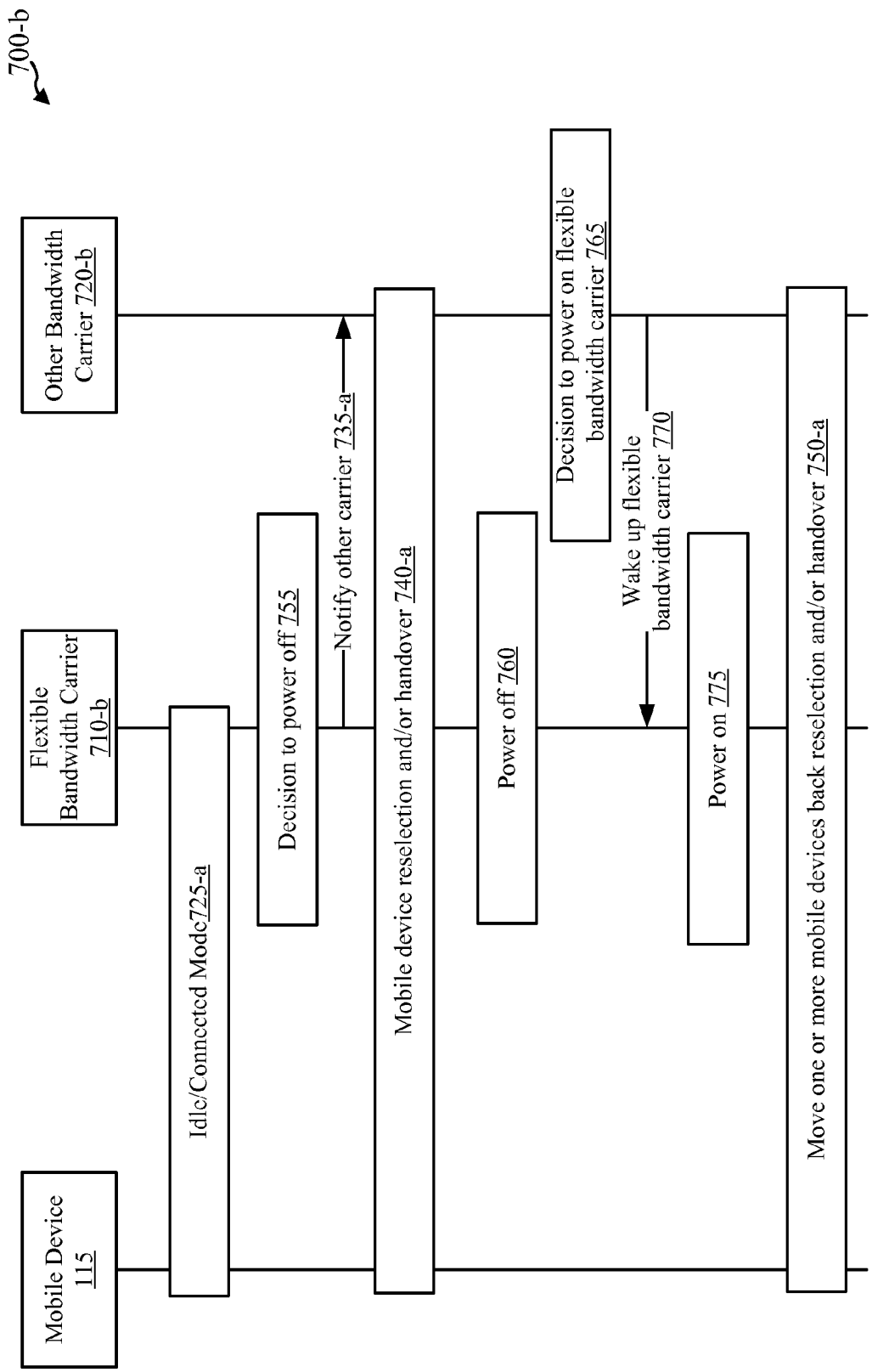
FIG. 7B shows a system communications diagram in accordance with various embodiments.

Turning now to FIG. 7B, a system communications diagram 700-b show one possible procedure for network energy savings in accordance with various embodiments. A mobile device 115 may be in an idle or connected mode, for example, with flexible bandwidth carrier 710-b as shown at block 725-b. Flexible bandwidth carrier 710-b may be associated with a base station 105 and/or controller 120 as seen in FIG. 100, for example. Block 755 reflects that a decision to change to power off may occur with respect to the flexible bandwidth carrier 710-b. While this may be made at a base station, in some situations, a mobile device, controller, and/or network may make this decision as shown in FIG. 1, for example. Once triggered, one or more aspects of the system may coordinate the power off. For example, a radio access network (RAN) entity such as the radio network controller (RNC) co-ordinate changes in N. In some cases, the RNC may be part of a base station 105, as shown in FIG. 1, for example. Another bandwidth carrier 720-b may be notified 735-a by flexible bandwidth carrier 710. The other bandwidth carrier 720 may be a normal bandwidth carrier or a flexible bandwidth carrier.

Some embodiments can mitigate the impact of the power off on the mobile devices in a variety of ways. For example, broadcast channel (BCCH) modification information may be utilized. As shown in the system communications diagram 700-b, one or more other bandwidth carriers may be notified 735-a that a power off may occur for the flexible bandwidth carrier. In some cases, messages may be broadcast to mobile devices regarding the power off. One or more mobile devices 115 may be handed over and/or reselected to one of the other bandwidth carriers as shown in block 740-a. The power off may be implemented as shown in block 760. The mobile device 115 may be moved back after the change as shown in block 750-a. In some cases, system information may be modified to facilitate re-selection to other cells and back to cell after change.

In some embodiments, a base station may receive a power off request from a network device, such as RAN. The base station may implement the power off, as shown in block 760. In some cases, the mobile devices 115 may be moved over to the flexible bandwidth carrier after the bandwidth change as shown in block 750-a. A decision to power on the flexible bandwidth carrier 710-b may be made as shown in block 765. A wake-up signal may be sent to flexible bandwidth carrier 770. The flexible bandwidth carrier may power on as shown in block 775.

Some embodiments may include adapting flexible bandwidth for downlink and/or uplink carrier bandwidth, allowing for variable downlink and/or uplink carrier bandwidth. For some wireless applications, throughput requirements for the downlink and uplink may differ; therefore, efficient allocation of spectrum may be achieved by dynamically changing the downlink and/or uplink bandwidth based on the traffic demands, for example. For more efficient placement, the carrier frequency channel numbers may also be changed during the bandwidth change. Some embodiments may utilize multiple flexible uplink carriers and/or flexible downlink carriers. Different users may be assigned to different flexible uplink carriers and/or flexible downlink carriers based on their individual needs. Furthermore, different flexible uplink carriers may be cross coupled with different flexible downlink carriers.

Figure 8A:
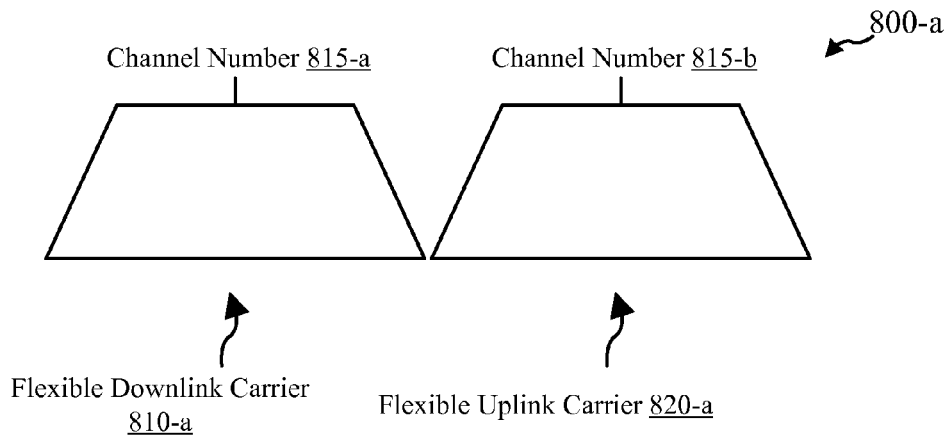
FIG. 8A shows a carrier system in accordance with various embodiments.
Figure 8B:
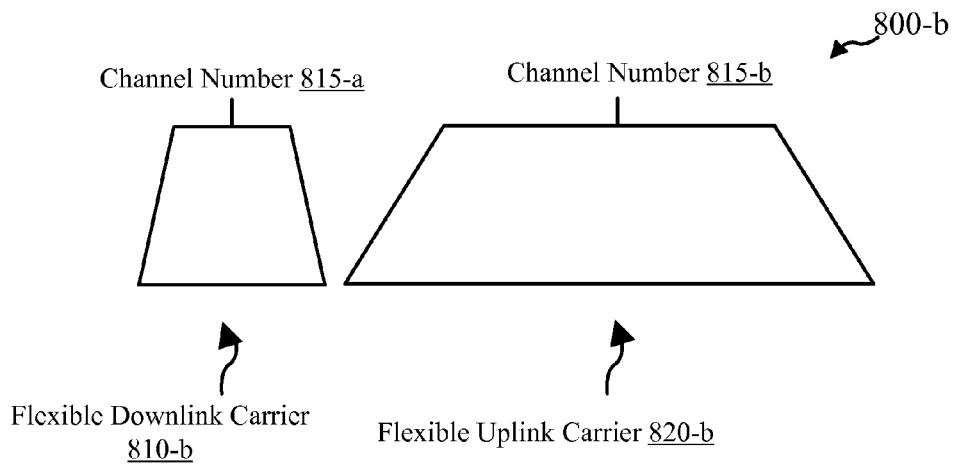
FIG. 8B shows a carrier system in accordance with various embodiments.
Figure 8C:
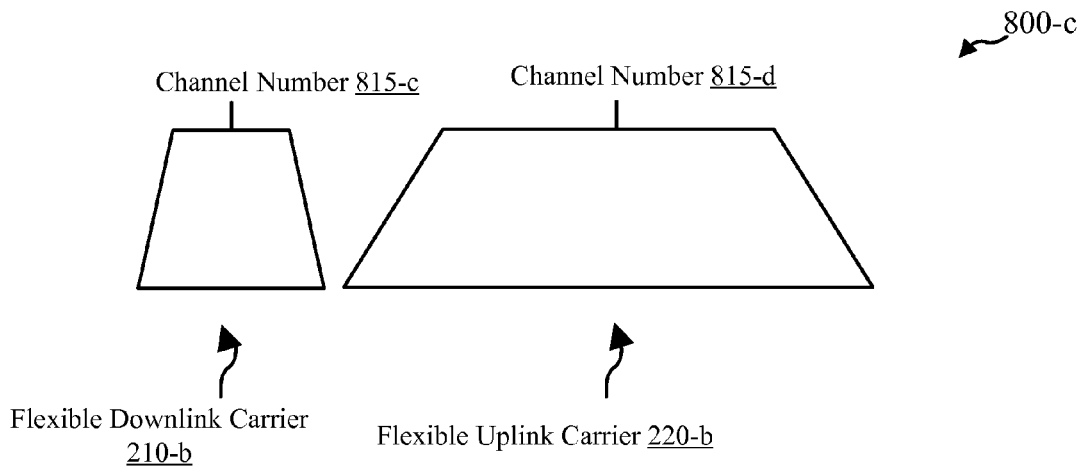
FIG. 8C shows a carrier system in accordance with various embodiments.
Figure 8D:
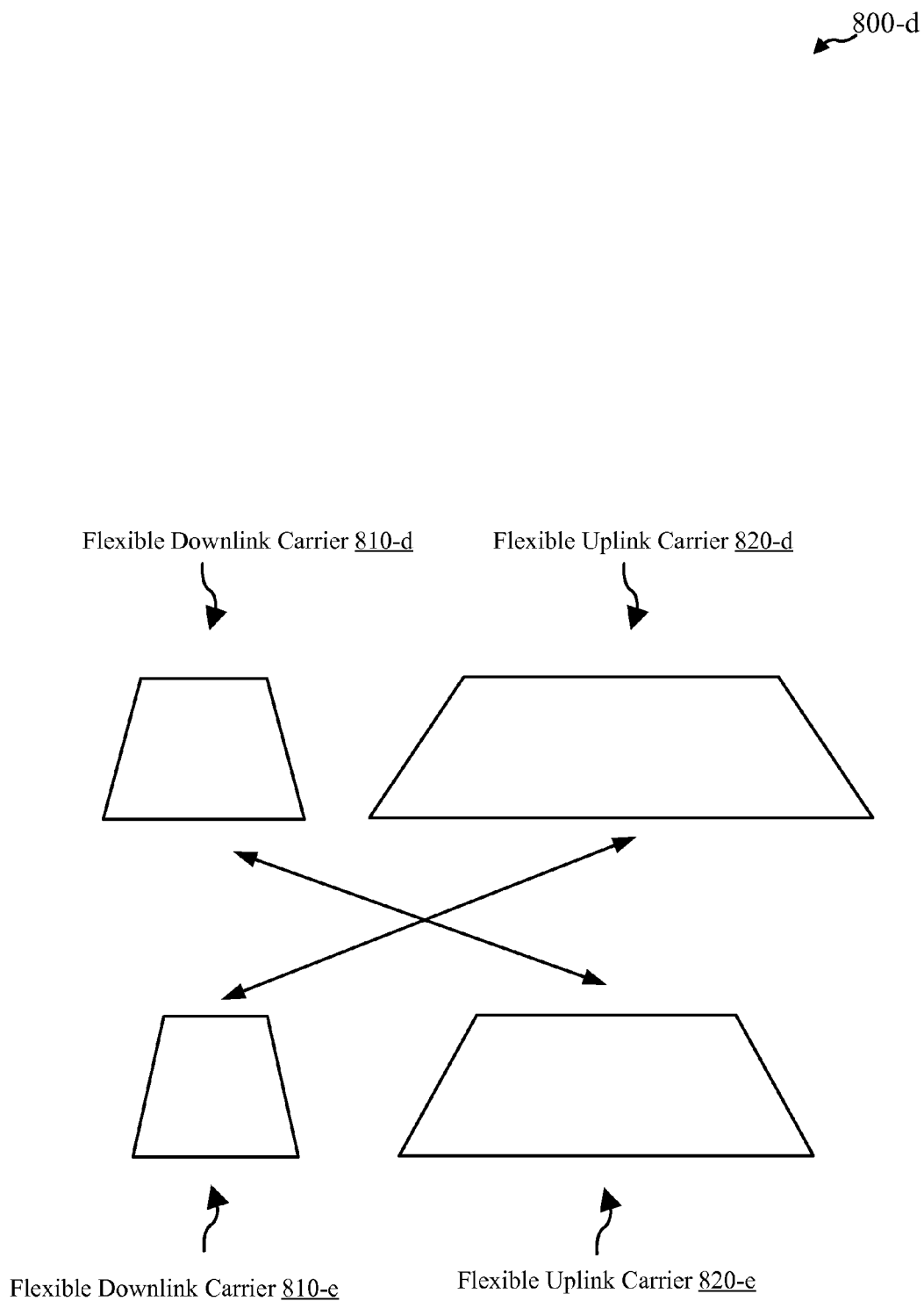
FIG. 8D shows a carrier system in accordance with various embodiments.

FIG. 8A shows a carrier system 800-a that includes a flexible downlink carrier 810-a and a flexible uplink carrier 820-a in accordance with various embodiments. The flexible downlink carrier 810-a and the flexible uplink carrier 820-a may utilize the same scaling factor N=S. The flexible downlink carrier 810-a may utilize a channel number 815-a and the flexible uplink carrier 820-a may utilize a channel number 815-b. FIG. 8B shows a carrier system 800-b that includes a flexible downlink carrier 810-b and a flexible uplink carrier 820-b in accordance with various embodiments. The flexible downlink carrier 810-b may represent an adapted form of the flexible downlink carrier 810-a of FIG. 8A, where the scaling factor N=S has decreased to another scaling factor N=M, where M<S. The flexible uplink carrier 810-b may represent an adapted form of the flexible uplink carrier 810-a of FIG. 8A, where the scaling factor N=S has increased to another scaling factor N=T, where T>S. In some embodiments, this scaling factor may decrease. The flexible downlink carrier 810-a may utilize a channel number 815-a and the flexible uplink carrier 820-b may utilize a channel number 815-b, the same channel numbers as seen in FIG. 8A. FIG. 8C shows a carrier system 800-c where the channel numbers 815-c and 815-d associated with flexible downlink carrier 810-b and flexible uplink carrier 820-b may be changed. This change in channel number may occur during the bandwidth channel. FIG. 8D shows a carrier system 800-d where a flexible downlink carrier 810-d may be cross coupled with flexible uplink carrier 820-e; similarly, flexible uplink carrier 820-d may be cross coupled with flexible downlink carrier 810-e.

Figure 9:
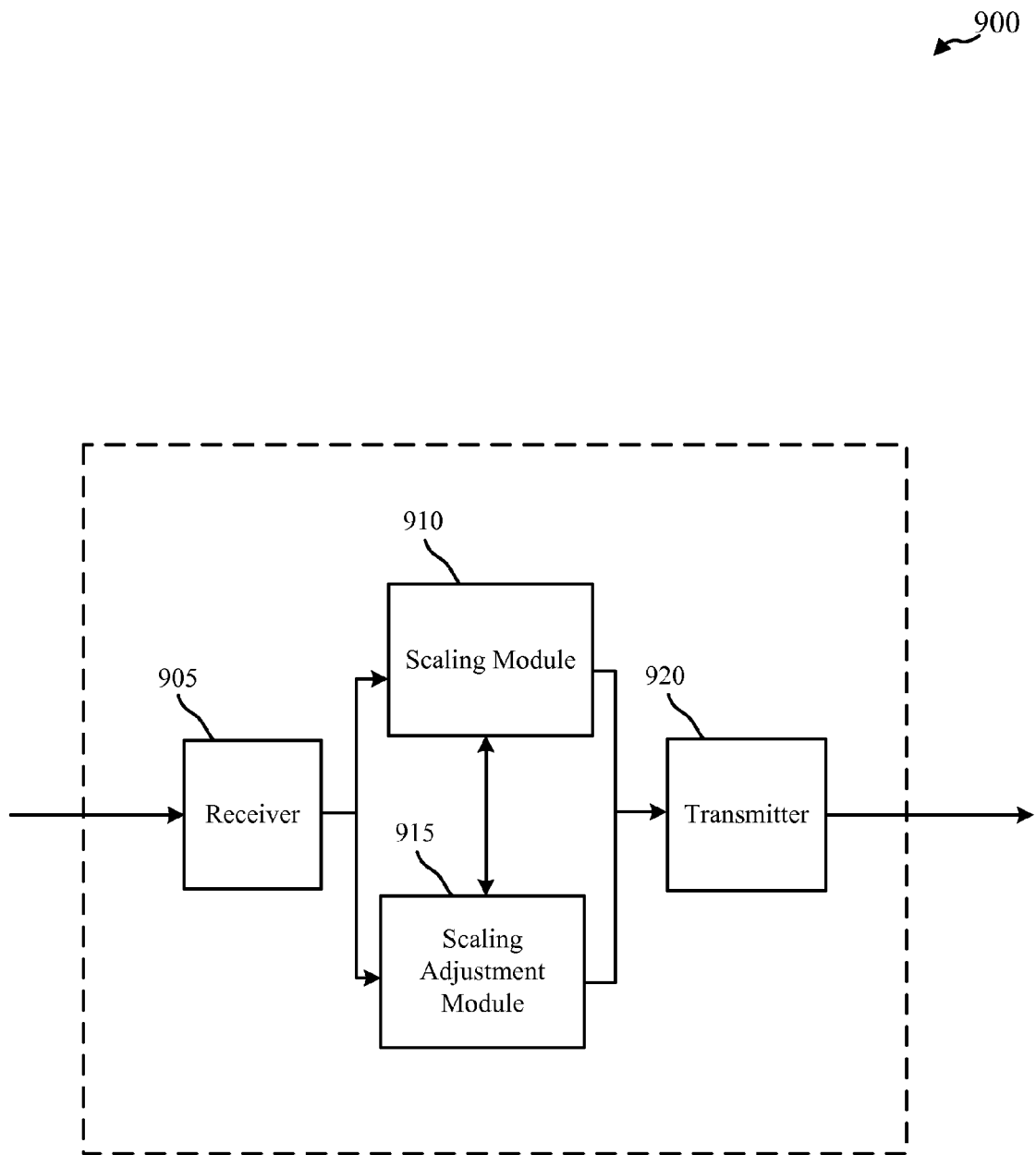
FIG. 9 shows a block diagram of a device that includes dynamic bandwidth adaptation functionality in accordance with various embodiments.

Turning next to FIG. 9, a block diagram illustrates a device 900 that includes flexible bandwidth adaptation functionality in accordance with various embodiments. The device 900 may be an example of aspects of the base stations 105 of FIG. 1, FIG. 2, FIG. 3, FIG. 11, and/or FIG. 12. The device 900 may be an example of aspects of the mobile devices 115 of FIG. 1, FIG. 2, FIG. 3, FIG. 7, FIG. 10, FIG. 11, and/or FIG. 12. The device 900 may also be a processor. The device 900 may include a receiver module 905, a scaling module 910, a scaling adjustment module 915, and/or a transmitter module 920. Each of these components may be in communication with each other.

These components of the device 900 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 905 may receive information such as packet, data, and/or signaling information regarding what device 900 has received or transmitted. The received information may be utilized by the scaling module 910 and/or scaling adjustment module 915 for a variety of purposes.

The scaling module 910 may be configured to identify a first scaling factor of a first flexible bandwidth carrier. The scaling module 910 and/or the scaling adjustment module 915 may be configured to determine a second scaling factor. The scaling adjustment module 915 may be configured to adapt a bandwidth of the first flexible bandwidth carrier from utilizing the first scaling factor to utilizing the second scaling factor.

In some embodiments, the scaling adjustment module 915 may be configured to adapt the bandwidth of the first flexible bandwidth from utilizing the first scaling factor to utilizing the second scaling factor, which may include increasing the bandwidth of the first flexible bandwidth carrier. Adapting the bandwidth of the first flexible bandwidth from utilizing the first scaling factor to utilizing the second scaling factor may include decreasing the bandwidth of the first flexible bandwidth carrier.

In some embodiments, the device 900 may be configured utilizing one more or more of its modules to hand over a mobile device camped on the first flexible bandwidth carrier to another bandwidth carrier before decreasing the bandwidth of the first flexible bandwidth carrier. The mobile device may be handed back to the first flexible bandwidth carrier after decreasing the bandwidth of the first flexible bandwidth carrier. Similar actions may be performed where the bandwidth of the first flexible bandwidth carrier is increased.

The scaling adaptation module 915 may be configured to adapt a bandwidth of a first downlink flexible bandwidth carrier from utilizing the first scaling factor to utilizing a third scaling factor different from the second scaling factor. The first flexible bandwidth carrier may include a first uplink flexible bandwidth carrier and the second scaling factor and third scaling factor are determined based on one or more traffic patterns for at least the first uplink flexible bandwidth carrier or the first downlink flexible bandwidth carrier. Some embodiments include adapting a bandwidth of a second downlink flexible bandwidth carrier from utilizing the first scaling factor to utilizing a fourth scaling factor; and/or adapting a bandwidth of a second uplink flexible bandwidth carrier from utilizing the first scaling factor to utilizing a fifth scaling factor. Some embodiments include coupling at least the first uplink flexible bandwidth carrier with the second downlink flexible carrier or the second uplink flexible bandwidth carrier with the first downlink flexible bandwidth carrier. Some embodiments include assigning at least one user to at least the first uplink flexible bandwidth carrier, the second uplink flexible bandwidth carrier, the first downlink flexible bandwidth carrier, or the second downlink flexible bandwidth carrier based on at least a requirement or a need of the at least one user. Some embodiments include changing at least a first center frequency for the first uplink flexible bandwidth carrier or a second center frequency for the first downlink flexible bandwidth carrier.

The transmitter module 920 may be configured to transmit the second scaling factor to a mobile device; and/or transmitting at least a time or a timing period to the mobile device regarding when the bandwidth of the first flexible bandwidth carrier will be adapted from utilizing the first scaling factor to utilizing the second scaling factor. Transmitting data to the mobile device may be eschewed, avoided, and/or not scheduled during the timing period.

In some embodiments, increasing the bandwidth of the first flexible bandwidth carrier increases a capacity of the first flexible bandwidth carrier. In some embodiments, decreasing the bandwidth of the first flexible bandwidth carrier comprises at least reducing interference with one or more cells, reducing in-band interference, or conserving energy.

Figure 10:
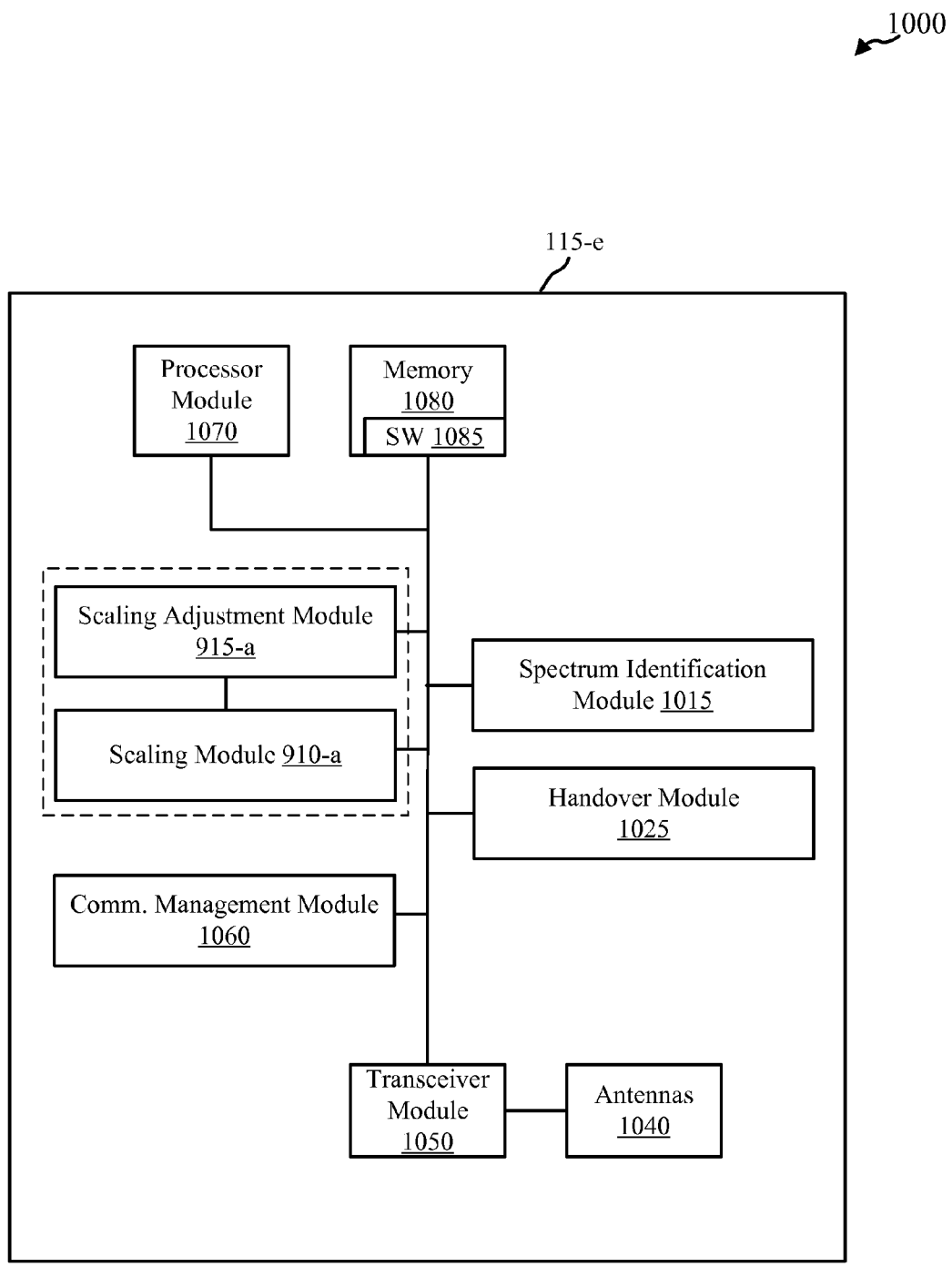
FIG. 10 shows a block diagram of a mobile device in accordance with various embodiments.

FIG. 10 is a block diagram 1000 of a mobile device 115-*e* configured to facilitate the use of flexible bandwidth in accordance with various embodiments. The mobile device 115-*e* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-*e* may have an internal power supply (not shown), such as a small battery, to facilitate mobile operation. In some embodiments, the mobile device 115-*e* may be the mobile device 115 of FIG. 1, FIG. 2, FIG. 3, FIG. 7, FIG. 10, FIG. 11, and/or FIG. 12, and/or the device 900 of FIG. 9. The mobile device 115-*e* may be a multi-mode mobile device. The mobile device 115-*e* may be referred to as a wireless communications device in some cases.

The mobile device 115-*e* may include antennas 1040, a transceiver module 1050, memory 1080, and a processor module 1070, which each may be in communication, directly or indirectly, with each other (e.g., via one or more buses). The transceiver module 1050 is configured to communicate bi-directionally, via the antennas 1040 and/or one or more wired or wireless links, with one or more networks, as described above. For example, the transceiver module 1050 may be configured to communicate bi-directionally with base stations 105 of FIG. 1, FIG. 2, FIG. 3, FIG. 11, and/or FIG. 12. The transceiver module 1050 may include a modem configured to modulate the packets and provide the modulated packets to the antennas 1040 for transmission, and to demodulate packets received from the antennas 1040. While the mobile device 115-*e* may include a single antenna, the mobile device 115-*e* will typically include multiple antennas 1040 for multiple links.

The memory 1080 may include random access memory (RAM) and read-only memory (ROM). The memory 1080 may store computer-readable, computer-executable software code 1085 containing instructions that are configured to, when executed, cause the processor module 1070 to perform various functions described herein (e.g., call processing, database management, message routing, etc.). Alternatively, the software 1085 may not be directly executable by the processor module 1070 but be configured to cause the computer (e.g., when compiled and executed) to perform functions described herein.

The processor module 1070 may include an intelligent hardware device, e.g., a central processing unit (CPU) such as those made by Intel® Corporation or AMD®, a microcontroller, an application-specific integrated circuit (ASIC), etc. The processor module 1070 may include a speech encoder (not shown) configured to receive audio via a microphone, convert the audio into packets (e.g., 30 ms in length) representative of the received audio, provide the audio packets to the transceiver module 1050, and provide indications of whether a user is speaking. Alternatively, an encoder may only provide packets to the transceiver module 1050, with the provision or withholding/suppression of the packet itself providing the indication of whether a user is speaking.

According to the architecture of FIG. 10, the mobile device 115-*e* may further include a communications management module 1060. The communications management module 1060 may manage communications with other mobile devices 115. By way of example, the communications management module 1060 may be a component of the mobile device 115-*e* in communication with some or all of the other components of the mobile device 115-*e* via a bus. Alternatively, functionality of the communications management module 1060 may be implemented as a component of the transceiver module 1050, as a computer program product, and/or as one or more controller elements of the processor module 1070.

The components for mobile device 115-*e* may be configured to implement aspects discussed above with respect to device 900 in FIG. 9 and may not be repeated here for the sake of brevity. The scaling module 910-*a* may be the scaling module 910 of FIG. 9. The scaling adjustment module 915-*a* may be the scaling adjustment module 915 of FIG. 9.

The mobile device 115-*e* may also include a spectrum identification module 1015. The spectrum identification module 1015 may be utilized to identify spectrum available for flexible waveforms. In some embodiments, a handover module 1025 may be utilized to perform handover procedures of the mobile device 115-*e* from one base station to another. For example, the handover module 1025 may perform a handover procedure of the mobile device 115-*e* from one base station to another where normal waveforms are utilized between the mobile device 115-*e* and one of the base stations and flexible waveforms are utilized between the mobile device and another base station. A scaling module 910-*a* may be utilized to scale and/or alter chip rates to generate flexible waveforms.

In some embodiments, the transceiver module 1050, in conjunction with antennas 1040, along with other possible components of mobile device 115-*e*, may transmit information regarding flexible waveforms and/or scaling factors from the mobile device 115-*e* to base stations or a core network. In some embodiments, the transceiver module 1050, in conjunction with antennas 1040, along with other possible components of mobile device 115-*e*, may transmit information, such flexible waveforms and/or scaling factors, to base stations or a core network such that these devices or systems may utilize flexible waveforms.

Figure 11:
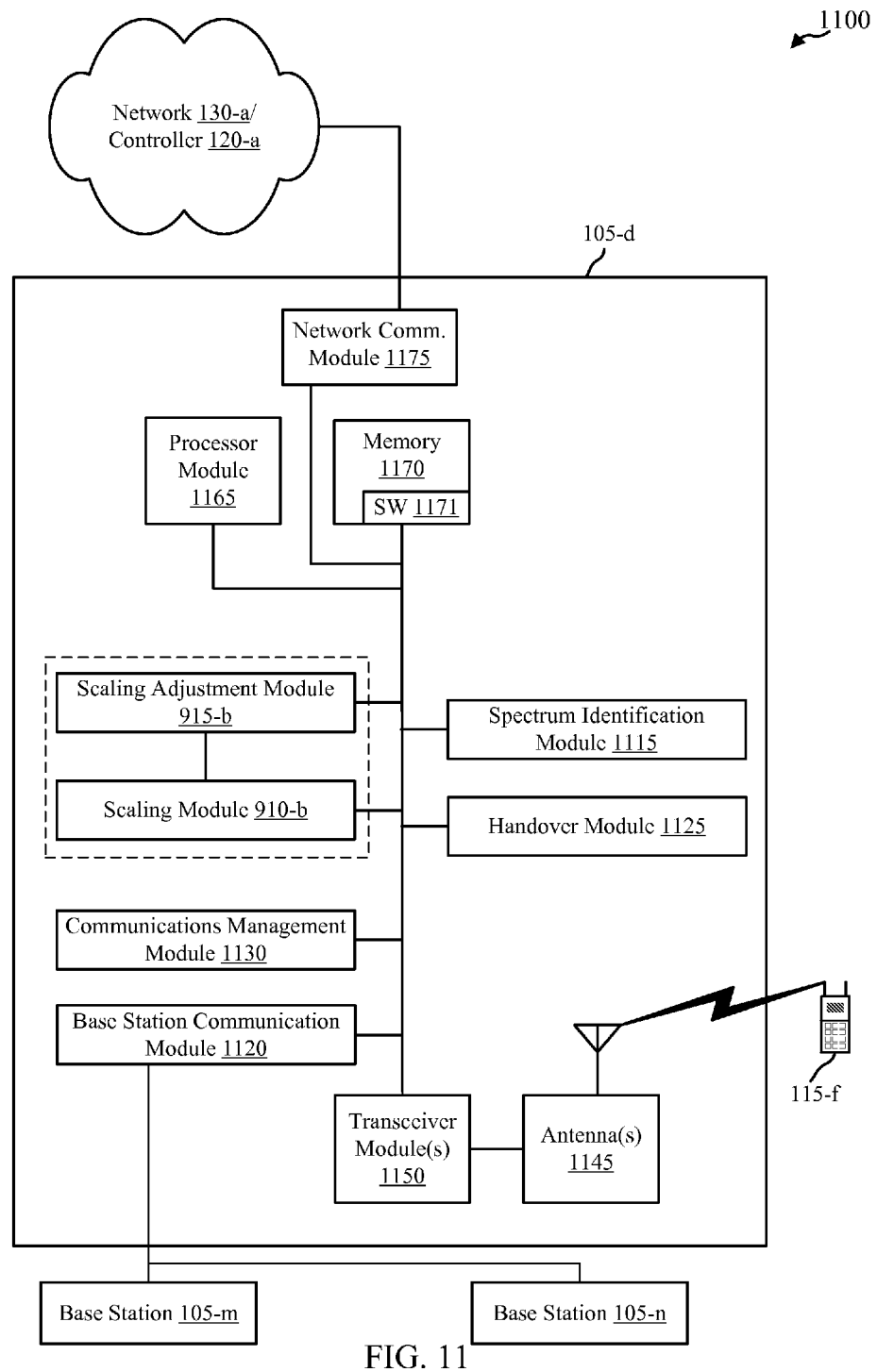
FIG. 11 shows a block diagram of a wireless communications system in accordance with various embodiments.

FIG. 11 shows a block diagram of a communications system 1100 that may be configured for utilizing flexible waveforms in accordance with various embodiments. This system 1100 may be an example of aspects of the system 100 depicted in FIG. 1, systems 200 of FIG. 2, system 300 of FIG. 3, and/or system 1200 of FIG. 12. The base station 105-*d* may include antennas 1145, a transceiver module 1150, memory 1170, and a processor module 1165, which each may be in communication, directly or indirectly, with each other (e.g., over one or more buses). The transceiver module 1150 may be configured to communicate bi-directionally, via the antennas 1145, with the mobile device 115-*f*, which may be a multi-mode mobile device. The transceiver module 1150 (and/or other components of the base station 105-*d*) may also be configured to communicate bi-directionally with one or more networks. In some cases, the base station 105-*d* may communicate with the network 130-*a* and/or controller 120-*a* through network communications module 1175. Base station 105-*d* may be an example of an eNodeB base station, a Home eNodeB base station, a NodeB base station, and/or a Home NodeB base station. Controller 120-*a* may be integrated into base station 105-*d* in some cases, such as with an eNodeB base station.

Base station 105-*d* may also communicate with other base stations 105, such as base station 105-*m* and base station 105-*n*. Each of the base stations 105 may communicate with mobile device 115-*f* using different wireless communications technologies, such as different Radio Access Technologies. In some cases, base station 105-*d* may communicate with other base stations such as 105-*m* and/or 105-*n* utilizing base station communication module 1120. In some embodiments, base station communication module 1120 may provide an X2 interface within an LTE wireless communication technology to provide communication between some of the base stations 105. In some embodiments, base station 105-*d* may communicate with other base stations through controller 120-*a* and/or network 130-*a*.

The memory 1170 may include random access memory (RAM) and read-only memory (ROM). The memory 1170 may also store computer-readable, computer-executable software code 1171 containing instructions that are configured to, when executed, cause the processor module 1165 to perform various functions described herein (e.g., call processing, database management, message routing, etc.). Alternatively, the software 1171 may not be directly executable by the processor module 1165 but be configured to cause the computer, e.g., when compiled and executed, to perform functions described herein.

The processor module 1165 may include an intelligent hardware device, e.g., a central processing unit (CPU) such as those made by Intel® Corporation or AMD®, a microcontroller, an application-specific integrated circuit (ASIC), etc. The processor module 1165 may include a speech encoder (not shown) configured to receive audio via a microphone, convert the audio into packets (e.g., 30 ms in length) representative of the received audio, provide the audio packets to the transceiver module 1150, and provide indications of whether a user is speaking. Alternatively, an encoder may only provide packets to the transceiver module 1150, with the provision or withholding/suppression of the packet itself providing the indication of whether a user is speaking.

The transceiver module 1150 may include a modem configured to modulate the packets and provide the modulated packets to the antennas 1145 for transmission, and to demodulate packets received from the antennas 1145. While some examples of the base station 105-*d* may include a single antenna 1145, the base station 105-*d* preferably includes multiple antennas 1145 for multiple links which may support carrier aggregation. For example, one or more links may be used to support macro communications with mobile device 115-*f*.

According to the architecture of FIG. 11, the base station 105-*d* may further include a communications management module 1130. The communications management module 1130 may manage communications with other base stations 105. By way of example, the communications management module 1130 may be a component of the base station 105-*d* in communication with some or all of the other components of the base station 105-*d* via a bus. Alternatively, functionality of the communications management module 1130 may be implemented as a component of the transceiver module 1150, as a computer program product, and/or as one or more controller elements of the processor module 1165.

The components for base station 105-*d* may be configured to implement aspects discussed above with respect to device 900 in FIG. 9 and may not be repeated here for the sake of brevity. The scaling module 910-*b* may be the scaling module 910 of FIG. 9. The scaling adjustment module 915-*b* may be the scaling adjustment module 915 of FIG. 9.

The base station 105-*d* may also include a spectrum identification module 1115. The spectrum identification module 1115 may be utilized to identify spectrum available for flexible waveforms. In some embodiments, a handover module 1125 may be utilized to perform handover procedures of the mobile device 115-*f* from one base station 105 to another. For example, the handover module 1125 may perform a handover procedure of the mobile device 115-*f* from base station 105-*d* to another where normal waveforms are utilized between the mobile device 115-*f* and one of the base stations and flexible waveforms are utilized between the mobile device and another base station. A scaling module 910-*b* may be utilized to scale and/or alter chip rates to generate flexible waveforms.

In some embodiments, the transceiver module 1150 in conjunction with antennas 1145, along with other possible components of base station 105-*d*, may transmit information regarding flexible waveforms and/or scaling factors from the base station 105-*d* to the mobile device 115-*f*, to other base stations 105-*m*/105-*n*, or core network 130-*a*. In some embodiments, the transceiver module 1150 in conjunction with antennas 1145, along with other possible components of base station 105-*d*, may transmit information to the mobile device 115-*f*, to other base stations 105-*m*/105-*n*, or core network 130-*a*, such as flexible waveforms and/or scaling factors, such that these devices or systems may utilize flexible waveforms.

Figure 12:
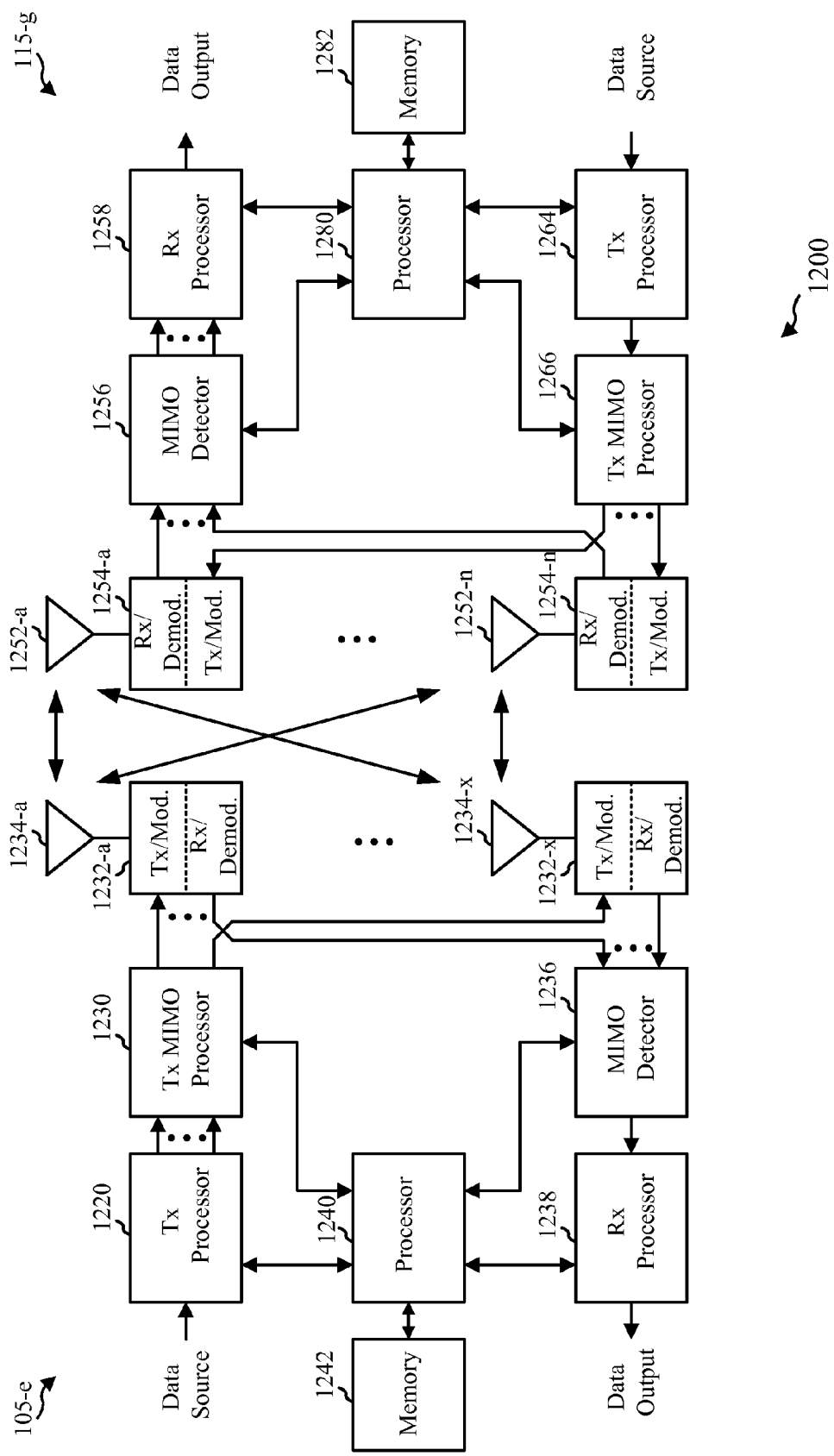
FIG. 12 shows a block diagram of a wireless communications system that includes a base station and a mobile device in accordance with various embodiments.

FIG. 12 is a block diagram of a system 1200 including a base station 105-*e* and a mobile device 115-*g* in accordance with various embodiments. This system 1200 may be an example of the system 100 of FIG. 1, systems 200 of FIG. 2, system 300 of FIG. 3, and/or system 1100 of FIG. 11. The base station 105-*e* may be equipped with antennas 1234-*a* through 1234-*x*, and the mobile device 115-*g* may be equipped with antennas 1252-*a* through 1252-*n*. At the base station 105-*e*, a transmit processor 1220 may receive data from a data source.

The transmit processor 1220 may process the data. The transmit processor 1220 may also generate reference symbols, and a cell-specific reference signal. A transmit (TX) MIMO processor 1230 may perform spatial processing (e.g., precoding) on data symbols, control symbols, and/or reference symbols, if applicable, and may provide output symbol streams to the transmit modulators 1232-*a* through 1232-*x*. Each modulator 1232 may process a respective output symbol stream (e.g., for OFDM, etc.) to obtain an output sample stream. Each modulator 1232 may further process (e.g., convert to analog, amplify, filter, and upconvert) the output sample stream to obtain a downlink (DL) signal. In one example, DL signals from modulators 1232-*a* through 1232-*x* may be transmitted via the antennas 1234-*a* through 1234-*x*, respectively. The transmit processor 1220 may receive information from a processor 1240. The processor 1240 may be coupled with a memory 1242. The processor 1240 may be configured to generate flexible waveforms through altering a chip rate and/or utilizing a scaling factor. In some embodiments, the processor module 1240 may be configured for dynamically adapting flexible bandwidth in accordance with various embodiments. The processor 1240 may dynamically adjust one or more scale factors of the flexible bandwidth signal associated with transmissions between base station 105-*e* and mobile device 115-*g*. These adjustments may be made based on information such as traffic patterns, interference measurements, etc.

For example, within system 1200, the processor 1240 may increase the bandwidth of a flexible bandwidth signal through dynamically decreasing a scaling factor of the flexible bandwidth signal. Increasing the bandwidth of the flexible bandwidth signal may be utilized to increase network capacity of the carrier. The processor 1240 may decrease the bandwidth of a flexible bandwidth signal through dynamically increasing the scaling factor of the flexible system. This may be utilized to achieve purposes such as reducing the interference to other cells and/or reducing in-band interference. In some embodiments, a flexible bandwidth carrier may be utilized to conserve energy within system 1200. For example, an overlay flexible bandwidth carrier may reduce its bandwidth or even turn off when its traffic is low and then turn back on when the traffic increases in neighboring cells. Before a flexible bandwidth carrier reduces its bandwidth or powers off, the mobile device 115-*g* camped on the flexible bandwidth carrier associated with the base station 105-*e* may be moved to an underlay flexible or normal bandwidth carrier. The underlay carrier and the overlay carrier may be co-located or nonco-located. In some cases, mobile device 115-*g* may remain on the overlay flexible bandwidth carrier, while no data may be scheduled for transmission while the overlay flexible bandwidth carrier changes its bandwidth or is powered off.

In some embodiments, the uplink and downlink bandwidths of a flexible bandwidth carrier associated with a base station 105-*e* and/or mobile device 115-*g* may be dynamically adjusted either jointly or independently by processor 1240. Information such as traffic patterns within system 1200 may be utilized to determine how to dynamically adjust the uplink and/or downlink bandwidths of a flexible bandwidth carrier. In some cases, the bandwidth of the downlink carrier bandwidth may be decreased by processor 1240 while the uplink carrier bandwidth is increased or held constant. The channel numbers may also be dynamically changed by processor 1240 such that the center frequency for uplink and/or downlink bandwidth carriers may be dynamically changed.

At the mobile device 115-*g*, the mobile device antennas 1252-*a* through 1252-*n* may receive the DL signals from the base station 105-*e* and may provide the received signals to the demodulators 1254-*a* through 1254-*n*, respectively. Each demodulator 1254 may condition (e.g., filter, amplify, downconvert, and digitize) a respective received signal to obtain input samples. Each demodulator 1254 may further process the input samples (e.g., for OFDM, etc.) to obtain received symbols. A MIMO detector 1256 may obtain received symbols from all the demodulators 1254-*a* through 1254-*n*, perform MIMO detection on the received symbols, if applicable, and provide detected symbols. A receive processor 1258 may process (e.g., demodulate, deinterleave, and decode) the detected symbols, providing decoded data for the mobile device 115-*g* to a data output, and provide decoded control information to a processor 1280, or memory 1282.

On the uplink (UL) or reverse link, at the mobile device 115-*g*, a transmit processor 1264 may receive and process data from a data source. The transmitter processor 1264 may also generate reference symbols for a reference signal. The symbols from the transmit processor 1264 may be precoded by a transmit MIMO processor 1266, if applicable, further processed by the demodulators 1254-*a* through 1254-*n* (e.g., for SC-FDMA, etc.), and be transmitted to the base station 105-*e* in accordance with the transmission parameters received from the base station 105-*e*. The transmit processor 1264 may also be configured to generate flexible waveforms through altering a chip rate and/or utilizing a scaling factor; this may be done dynamically in some cases. The transmit processor 1264 may receive information from processor 1280. The processor 1280 may provide for different alignment and/or offsetting procedures. The processor 1280 may also utilize scaling and/or chip rate information to perform measurements on the other subsystems, perform handoffs to the other subsystems, perform reselection, etc. The processor 1280 may invert the effects of time stretching associated with the use of flexible bandwidth through parameter scaling. At the base station 105-*e*, the UL signals from the mobile device 115-*g* may be received by the antennas 1234, processed by the demodulators 1232, detected by a MIMO detector 1236, if applicable, and further processed by a receive processor. The receive processor 1238 may provide decoded data to a data output and to the processor 1280. In some embodiments, the processor 1280 may be implemented as part of a general processor, the transmit processor 1264, and/or the receiver processor 1258.

In some embodiments, the processor module 1280 may be configured for dynamically adapting flexible bandwidth in accordance with various embodiments. The processor 1280 may dynamically adjust one or more scale factors of the flexible bandwidth signal associated with transmissions between base station 105-*e* and mobile device 115-*g*. These adjustments may be made based on information such as traffic patterns, interference measurements, etc.

For example, within system 1200, the processor 1280 may increase the bandwidth of a flexible bandwidth signal through dynamically decreasing a scaling factor of the flexible bandwidth signal. Increasing the bandwidth of the flexible bandwidth signal may be utilized to increase network capacity of the carrier. The processor 1280 may decrease the bandwidth of a flexible bandwidth signal through dynamically increasing the scaling factor of the flexible system. This may be utilized to achieve purposes such as reducing the interference to other cells and/or reducing in-band interference. In some embodiments, a flexible bandwidth carrier may be utilized to conserve energy within system 1200. For example, an overlay flexible bandwidth carrier may reduce its bandwidth or even turn off when its traffic is low and then turn back on when the traffic increases in neighboring cells. Before a flexible bandwidth carrier reduces its bandwidth or powers off, the mobile device 115-*g* camped on the flexible bandwidth carrier associated with the base station 105-*e* may be moved to an underlay flexible or normal bandwidth carrier. The underlay carrier and the overlay carrier may be co-located or nonco-located. In some cases, mobile device 115-*g* may remain on the overlay flexible bandwidth carrier, while no data may be scheduled for transmission while the overlay flexible bandwidth carrier changes its bandwidth or is powered off.

In some embodiments, the uplink and downlink bandwidths of a flexible bandwidth carrier associated with a base station 105-*e* and/or mobile device 115-*g* may be dynamically adjusted either jointly or independently by processor 1280. Information such as traffic patterns within system 1200 may be utilized to determine how to dynamically adjust the uplink and/or downlink bandwidths of a flexible bandwidth carrier. In some cases, the bandwidth of the downlink carrier bandwidth may be decreased by processor 1280 while the uplink carrier bandwidth is increased or held constant. The channel numbers may also be dynamically changed by processor 1280 such that the center frequency for uplink and/or downlink bandwidth carriers may be dynamically changed.

Figure 13A:
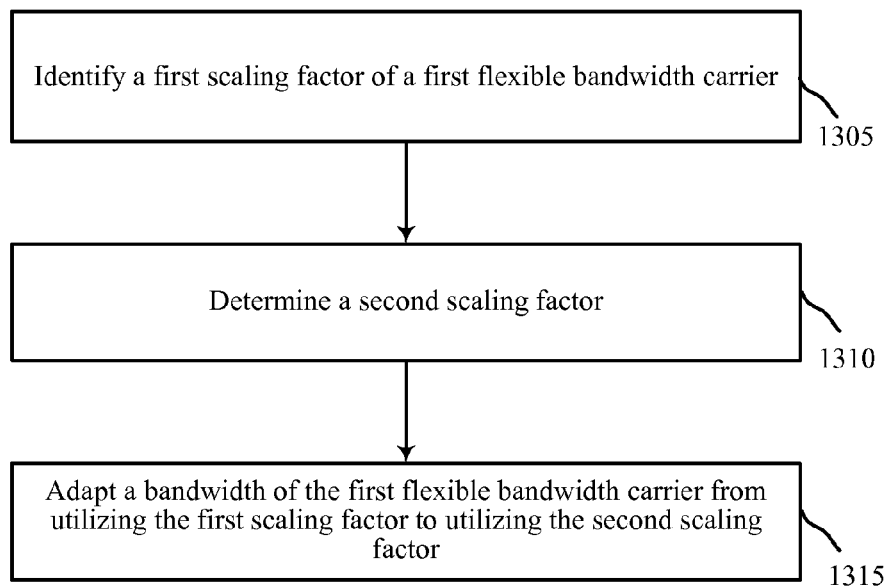
FIG. 13A shows a flow diagram of a method for dynamically adapting bandwidth within a wireless communications system in accordance with various embodiments.

Turning to FIG. 13A, a flow diagram of a method 1300-*a* for dynamically adapting flexible bandwidth in a wireless communications system in accordance with various embodiments. Method 1300-*a* may be implemented utilizing various wireless communications devices and/or systems including, but not limited to: a mobile device 115 as seen in FIG. 1, FIG. 2, FIG. 3, FIG. 7, FIG. 10, FIG. 11, and/or FIG. 12; a base station 105 as seen in FIG. 1, FIG. 2, FIG. 3, FIG. 11, and/or FIG. 12; a core network 130 or controller 120 as seen in FIG. 1 and/or FIG. 11; and/or a device 900 of FIG. 9.

At block 1305, a first scaling factor of a first flexible bandwidth carrier may be identified. At block 1310, a second scaling factor may be determined. At block 1315, a bandwidth of the first flexible bandwidth carrier may be adapted from utilizing the first scaling factor to utilizing the second scaling factor.

In some embodiments of method 1300-*a*, adapting the bandwidth of the first flexible bandwidth from utilizing the first scaling factor to utilizing the second scaling factor includes increasing the bandwidth of the first flexible bandwidth carrier. Adapting the bandwidth of the first flexible bandwidth from utilizing the first scaling factor to utilizing the second scaling factor may include decreasing the bandwidth of the first flexible bandwidth carrier.

Some embodiments of method 1300-*a* include handing over a mobile device camped on the first flexible bandwidth carrier to another bandwidth carrier before decreasing the bandwidth of the first flexible bandwidth carrier. The mobile device may be handed back to the first flexible bandwidth carrier after decreasing the bandwidth of the first flexible bandwidth carrier. Similar actions may be performed where the bandwidth of the first flexible bandwidth carrier is increased.

Some embodiments of method 1300-*a* include adapting a bandwidth of a first downlink flexible bandwidth carrier from utilizing the first scaling factor to utilizing a third scaling factor different from the second scaling factor. The first flexible bandwidth carrier may include a first uplink flexible bandwidth carrier and the second scaling factor and third scaling factor are determined based on one or more traffic patterns for at least the first uplink flexible bandwidth carrier or the first downlink flexible bandwidth carrier. Some embodiments include adapting a bandwidth of a second downlink flexible bandwidth carrier from utilizing the first scaling factor to utilizing a fourth scaling factor; and/or adapting a bandwidth of a second uplink flexible bandwidth carrier from utilizing the first scaling factor to utilizing a fifth scaling factor. Some embodiments include coupling at least the first uplink flexible bandwidth carrier with the second downlink flexible carrier or the second uplink flexible bandwidth carrier with the first downlink flexible bandwidth carrier. Some embodiments include assigning at least one user to at least the first uplink flexible bandwidth carrier, the second uplink flexible bandwidth carrier, the first downlink flexible bandwidth carrier, or the second downlink flexible bandwidth carrier based on at least a requirement or a need of the at least one user. Some embodiments include changing at least a first center frequency for the first uplink flexible bandwidth carrier or a second center frequency for the first downlink flexible bandwidth carrier.

Method 1300-*a* may include transmitting the second scaling factor to a mobile device; and/or transmitting at least a time or a timing period to the mobile device regarding when the bandwidth of the first flexible bandwidth carrier will be adapted from utilizing the first scaling factor to utilizing the second scaling factor. Transmitting data to the mobile device may be eschewed, avoided, and/or not scheduled during the timing period.

In some embodiments, increasing the bandwidth of the first flexible bandwidth carrier increases a capacity of the first flexible bandwidth carrier. In some embodiments, decreasing the bandwidth of the first flexible bandwidth carrier comprises at least reducing interference with one or more cells, reducing in-band interference, or conserving energy.

Figure 13B:
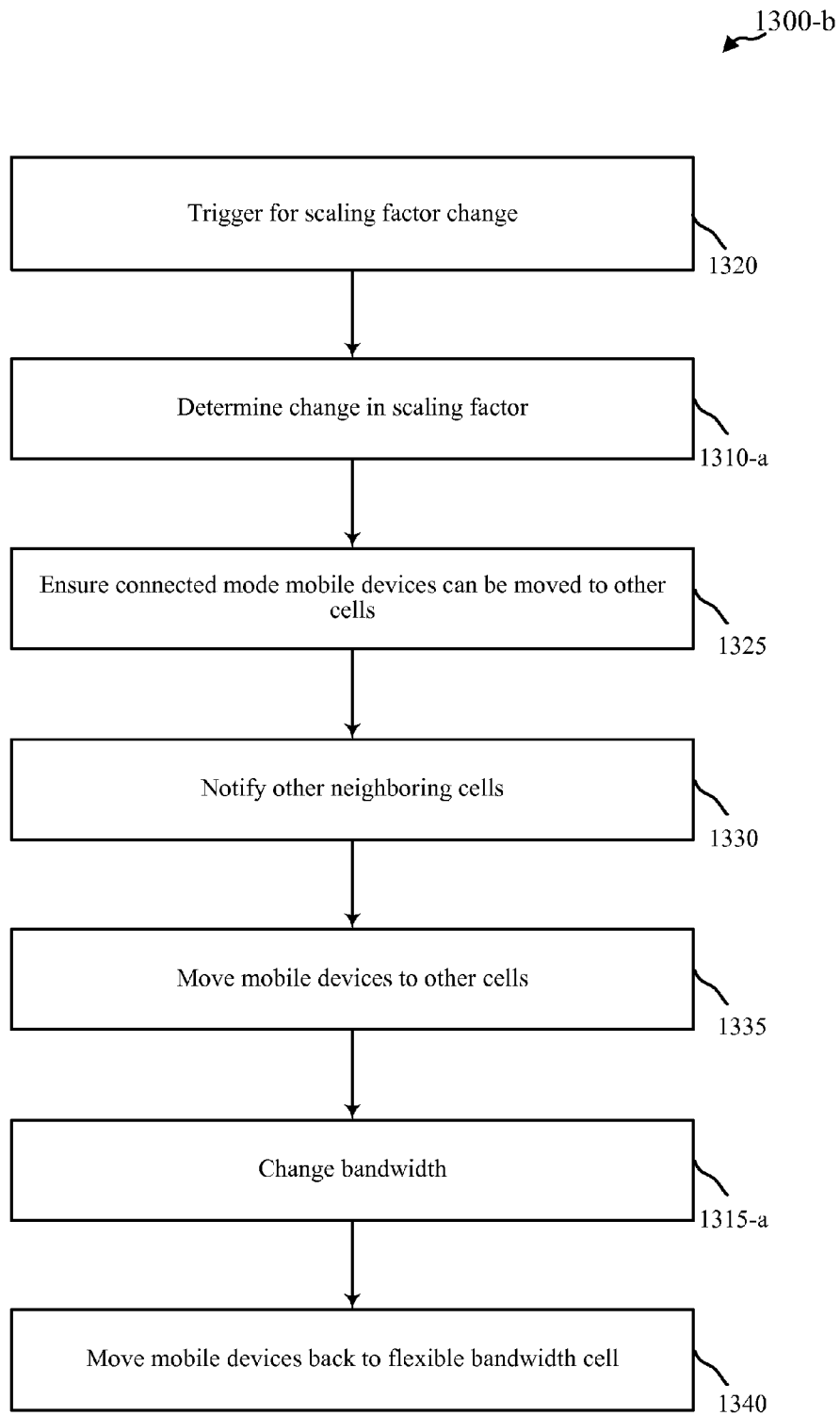
FIG. 13B shows a flow diagram of a method for reducing interference within a wireless communications system in accordance with various embodiments.

Turning to FIG. 13B, a flow diagram of a method 1300-*b* for dynamically adapting flexible bandwidth in a wireless communications system in accordance with various embodiments. Method 1300-*b* may be implemented utilizing various wireless communications devices and/or systems including, but not limited to: a mobile device 115 as seen in FIG. 1, FIG. 2, FIG. 3, FIG. 7, FIG. 10, FIG. 11, and/or FIG. 12; a base station 105 as seen in FIG. 1, FIG. 2, FIG. 3, FIG. 11, and/or FIG. 12; a core network 130 or controller 120 as seen in FIG. 1 and/or FIG. 11; and/or a device 900 of FIG. 9. Method 1300-*b* may be an example of method 1300-*a* of FIG. 13A.

At block 1320, a trigger may occur to reflect a need for a scaling factor change for a flexible bandwidth carrier. The trigger may be based on capacity, interference, and/or energy savings criteria, for example. At block 1310-*a*, a change in scaling factor may be determined; an appropriate scaling factor may be determined. At block 1325, it may be estimated and/or ensured that connected mode mobile devices may be moved over to other cells. At block 1330, other neighboring cells may be notified regarding the change in bandwidth for a cell and/or that mobile devices may be moved over to the neighboring cells. At block 1335, one or more mobile devices may be moved over to the other cells from the cell that may have its bandwidth adjusted. At block 1315-*a*, a bandwidth change may be made; for example, a bandwidth of the flexible bandwidth carrier may be adapted from utilizing a first scaling factor to utilizing the appropriate scaling factor, which may be a second scaling factor. At block 1340, one or more mobile devices may be moved back to the flexible bandwidth cell or flexible bandwidth carrier.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of dynamically adapting flexible bandwidth in a wireless communications system, the method comprising:
    identifying a first scaling factor of a first flexible bandwidth carrier;
    determining a second scaling factor;
    transmitting the second scaling factor to a mobile device;
    transmitting at least a time or a timing period to the mobile device regarding when a bandwidth of the first flexible bandwidth carrier will be adapted from utilizing the first scaling factor to utilizing the second scaling factor; and
    adapting the bandwidth of the first flexible bandwidth carrier from utilizing the first scaling factor to utilizing the second scaling factor.

2. The method of claim 1, wherein adapting the bandwidth of the first flexible bandwidth from utilizing the first scaling factor to utilizing the second scaling factor comprises:
    increasing the bandwidth of the first flexible bandwidth carrier.

3. The method of claim 2, wherein increasing the bandwidth of the first flexible bandwidth carrier increases a capacity of the first flexible bandwidth carrier.

4. The method of claim 1, wherein adapting the bandwidth of the first flexible bandwidth from utilizing the first scaling factor to utilizing the second scaling factor comprises:
decreasing the bandwidth of the first flexible bandwidth carrier.

5. The method of claim 4, wherein decreasing the bandwidth of the first flexible bandwidth carrier comprises at least reducing interference with one or more cells, reducing in-band interference, or conserving energy.

6. The method of claim 4, further comprising:
handing over a mobile device camped on the first flexible bandwidth carrier to another bandwidth carrier before decreasing the bandwidth of the first flexible bandwidth carrier.

7. The method of claim 1, further comprising:
adapting a bandwidth of a first downlink flexible bandwidth carrier from utilizing the first scaling factor to utilizing a third scaling factor different from the second scaling factor.

8. The method of claim 7, wherein the first flexible bandwidth carrier comprises a first uplink flexible bandwidth carrier and the second scaling factor and third scaling factor are determined based on one or more traffic patterns for at least the first uplink flexible bandwidth carrier or the first downlink flexible bandwidth carrier.

9. The method of claim 8, further comprising:
adapting a bandwidth of a second downlink flexible bandwidth carrier from utilizing the first scaling factor to utilizing a fourth scaling factor; and
adapting a bandwidth of a second uplink flexible bandwidth carrier from utilizing the first scaling factor to utilizing a fifth scaling factor.

10. The method of claim 9, further comprising:
coupling at least the first uplink flexible bandwidth carrier with the second downlink carrier or the second uplink flexible bandwidth carrier with the first downlink carrier.

11. The method of claim 9, further comprising:
assigning at least one user to at least the first uplink flexible bandwidth carrier, the second uplink flexible bandwidth carrier, the first downlink flexible bandwidth carrier, or the second downlink flexible bandwidth carrier based on at least a requirement or a need of the at least one user.

12. The method of claim 8, further comprising:
changing at least a first center frequency for the first uplink flexible bandwidth carrier or a second center frequency for the first downlink flexible bandwidth carrier.

13. The method of claim 1, further comprising:
eschewing transmitting data to the mobile device during the timing period.

14. A wireless communications system configured for dynamically adapting flexible bandwidth, the system comprising means for identifying a first scaling factor of a first flexible bandwidth carrier;
means for identifying a first scaling factor of a first flexible bandwidth carrier;
means for determining a second scaling factor;
means for transmitting the second scaling factor to a mobile device;
means for transmitting at least a time or a timing period to the mobile device regarding when a bandwidth of the first flexible bandwidth carrier will be adapted from utilizing the first scaling factor to utilizing the second scaling factor; and
means for adapting the bandwidth of the first flexible bandwidth carrier from utilizing the first scaling factor to utilizing the second scaling factor.

15. The system of claim 14, wherein the means for adapting the bandwidth of the first flexible bandwidth from utilizing the first scaling factor to utilizing the second scaling factor comprises:
means for increasing the bandwidth of the first flexible bandwidth carrier.

16. The system of claim 15, wherein increasing the bandwidth of the first flexible bandwidth carrier increases a capacity of the first flexible bandwidth carrier.

17. The system of claim 14, wherein the means for adapting the bandwidth of the first flexible bandwidth from utilizing the first scaling factor to utilizing the second scaling factor comprises:
means for decreasing the bandwidth of the first flexible bandwidth carrier.

18. The system of claim 17, wherein decreasing the bandwidth of the first flexible bandwidth carrier comprises at least reducing interference with one or more cells, reducing in-band interference, or conserving energy.

19. The system of claim 17, further comprising:
means for handing over a mobile device camped on the first flexible bandwidth carrier to another bandwidth carrier before decreasing the bandwidth of the first flexible bandwidth carrier.

20. The system of claim 14, further comprising:
means for adapting a bandwidth of a first downlink flexible bandwidth carrier from utilizing the first scaling factor to utilizing a third scaling factor different from the second scaling factor.

21. The system of claim 20, wherein the first flexible bandwidth carrier comprises a first uplink flexible bandwidth carrier and the second scaling factor and third scaling factor are determined based on one or more traffic patterns for at least the first uplink flexible bandwidth carrier or the first downlink flexible bandwidth carrier.

22. The system of claim 21, further comprising:
means for adapting a bandwidth of a second downlink flexible bandwidth carrier from utilizing the first scaling factor to utilizing a fourth scaling factor; and
means for adapting a bandwidth of a second uplink flexible bandwidth carrier from utilizing the first scaling factor to utilizing a fifth scaling factor.

23. The system of claim 22, further comprising:
means for coupling at least the first uplink flexible bandwidth carrier with the second downlink carrier or the second uplink flexible bandwidth carrier with the first downlink carrier.

24. The system of claim 22, further comprising:
means for assigning at least one user to at least the first uplink flexible bandwidth carrier, the second uplink flexible bandwidth carrier, the first downlink flexible bandwidth carrier, or the second downlink flexible bandwidth carrier based on at least a requirement or a need of the at least one user.

25. The system of claim 21, further comprising:
means for changing at least a first center frequency for the first uplink flexible bandwidth carrier or a second center frequency for the first downlink flexible bandwidth carrier.

26. The system of claim 14, further comprising:
means for eschewing transmitting data to the mobile device during the timing period.

27. A computer program product for dynamically adapting flexible bandwidth in a wireless communications system comprising:

a non-transitory computer-readable medium comprising:
    code for identifying a first scaling factor of a first flexible bandwidth carrier;
    code for determining a second scaling factor;
    code for transmitting the second scaling factor to a mobile device;
    code for transmitting at least a time or a timing period to the mobile device regarding when a bandwidth of the first flexible bandwidth carrier will be adapted from utilizing the first scaling factor to utilizing the second scaling factor; and
    code for adapting the bandwidth of the first flexible bandwidth carrier from utilizing the first scaling factor to utilizing the second scaling factor.

28. The computer program product of claim 27, wherein the code for adapting the bandwidth of the first flexible bandwidth from utilizing the first scaling factor to utilizing the second scaling factor comprises:
    code for increasing the bandwidth of the first flexible bandwidth carrier.

29. The computer program product of claim 28, wherein increasing the bandwidth of the first flexible bandwidth carrier increases a capacity of the first flexible bandwidth carrier.

30. The computer program product of claim 27, wherein the code for adapting the bandwidth of the first flexible bandwidth from utilizing the first scaling factor to utilizing the second scaling factor comprises:
    code for decreasing the bandwidth of the first flexible bandwidth carrier.

31. The computer program product of claim 30, wherein decreasing the bandwidth of the first flexible bandwidth carrier comprises at least reducing interference with one or more cells, reducing in-band interference, or conserving energy.

32. The computer program product of claim 30, wherein the non-transitory computer-readable medium further comprising:
    code for handing over a mobile device camped on the first flexible bandwidth carrier to another bandwidth carrier before decreasing the bandwidth the first flexible bandwidth carrier.

33. The computer program product of claim 27, wherein the non-transitory computer-readable medium further comprising:
    code for adapting a bandwidth of a first downlink flexible bandwidth carrier from utilizing the first scaling factor to utilizing a third scaling factor different from the second scaling factor.

34. The computer program product of claim 33, wherein the first flexible bandwidth carrier comprises a first uplink flexible bandwidth carrier and the second scaling factor and third scaling factor are determined based on one or more traffic patterns for at least the first uplink flexible bandwidth carrier or the first downlink flexible bandwidth carrier.

35. The computer program product of claim 34, wherein the non-transitory computer-readable medium further comprising:
    code for adapting a bandwidth of a second downlink flexible bandwidth carrier from utilizing the first scaling factor to utilizing a fourth scaling factor; and
    code for adapting a bandwidth of a second uplink flexible bandwidth carrier from utilizing the first scaling factor to utilizing a fifth scaling factor.

36. The computer program product of claim 35, wherein the non-transitory computer-readable medium further comprising:
    code for coupling at least the first uplink flexible bandwidth carrier with the second downlink carrier or the second uplink flexible bandwidth carrier with the first downlink carrier.

37. The computer program product of claim 35, wherein the non-transitory computer-readable medium further comprising:
    code for assigning at least one user to at least the first uplink flexible bandwidth carrier, the second uplink flexible bandwidth carrier, the first downlink flexible bandwidth carrier, or the second downlink flexible bandwidth carrier based on at least a requirement or a need of the at least one user.

38. The computer program product of claim 34, wherein the non-transitory computer-readable medium further comprising:
    code for changing at least a first center frequency for the first uplink flexible bandwidth carrier or a second center frequency for the first downlink flexible bandwidth carrier.

39. The computer program product of claim 27, wherein the non-transitory computer-readable medium further comprising:
    eschewing transmitting data to the mobile device during the timing period.

40. A wireless communications device configured for dynamically adapting flexible bandwidth in a wireless communications system, the device comprising:
    at least one processor configured to:
        identify a first scaling factor of a first flexible bandwidth carrier;
        determine a second scaling factor;
        transmit the second scaling factor to a mobile device;
        transmit at least a time or a timing period to the mobile device regarding when a bandwidth of the first flexible bandwidth carrier will be adapted from utilizing the first scaling factor to utilizing the second scaling factor; and
        adapt the bandwidth of the first flexible bandwidth carrier from utilizing the first scaling factor to utilizing the second scaling factor.

41. The device of claim 40, wherein the at least one processor configured to adapt the bandwidth of the first flexible bandwidth from utilizing the first scaling factor to utilizing the second scaling factor is configured to:
    increase the bandwidth of the first flexible bandwidth carrier.

42. The device of claim 41, wherein increasing the bandwidth of the first flexible bandwidth carrier increases a capacity of the first flexible bandwidth carrier.

43. The device of claim 40, wherein the at least one processor configured to adapt the bandwidth of the first flexible bandwidth from utilizing the first scaling factor to utilizing the second scaling factor is configured to:
    decrease the bandwidth of the first flexible bandwidth carrier.

44. The device of claim 43, wherein decreasing the bandwidth of the first flexible bandwidth carrier comprises at least reducing interference with one or more cells, reducing in-band interference, or conserving energy.

45. The device of claim 43, wherein the at least one processor is further configured to:
    hand over a mobile device camped on the first flexible bandwidth carrier to another bandwidth carrier before decreasing the bandwidth the first flexible bandwidth carrier.

46. The device of claim 40, wherein the at least one processor is further configured to:

adapt a bandwidth of a first downlink flexible bandwidth carrier from utilizing the first scaling factor to utilizing a third scaling factor different from the second scaling factor.

47. The device of claim 46, wherein the first flexible bandwidth carrier comprises a first uplink flexible bandwidth carrier and the second scaling factor and third scaling factor are determined based on one or more traffic patterns for at least the first uplink flexible bandwidth carrier or the first downlink flexible bandwidth carrier.

48. The device of claim 47, wherein the at least one processor is further configured to:

adapt a bandwidth of a second downlink flexible bandwidth carrier from utilizing the first scaling factor to utilizing a fourth scaling factor; and adapt a bandwidth of a second uplink flexible bandwidth carrier from utilizing the first scaling factor to utilizing a fifth scaling factor.

49. The device of claim 48, wherein the at least one processor is further configured to:

couple at least the first uplink flexible bandwidth carrier with the second downlink carrier or the second uplink flexible bandwidth carrier with the first downlink carrier.

50. The device of claim 48, wherein the at least one processor is further configured to:

assign at least one user to at least the first uplink flexible bandwidth carrier, the second uplink flexible bandwidth carrier, the first downlink flexible bandwidth carrier, or the second downlink flexible bandwidth carrier based on at least a requirement or a need of the at least one user.

51. The device of claim 47, wherein the at least one processor is further configured to:

change at least a first center frequency for the first uplink flexible bandwidth carrier or a second center frequency for the first downlink flexible bandwidth carrier.

52. The device of claim 40, wherein the at least one processor is further configured to:

eschewing transmitting data to the mobile device during the timing period.

* * * * *